US012470669B2

(12) United States Patent
Gonzalez

(10) Patent No.: US 12,470,669 B2
(45) Date of Patent: Nov. 11, 2025

(54) SYSTEMS, METHODS, AND MEDIA FOR VIDEO CALLING BASED ON GPS LOCATION

(71) Applicant: Jose Gonzalez, Davie, FL (US)

(72) Inventor: Jose Gonzalez, Davie, FL (US)

( * ) Notice: Subject to any disclaimer, the term of this patent is extended or adjusted under 35 U.S.C. 154(b) by 0 days.

(21) Appl. No.: 19/008,620

(22) Filed: Jan. 2, 2025

(65) Prior Publication Data
US 2025/0220136 A1    Jul. 3, 2025

(51) Int. Cl.
*H04N 7/14* (2006.01)
*G01S 19/13* (2010.01)
*G06Q 20/10* (2012.01)

(52) U.S. Cl.
CPC ............. *H04N 7/141* (2013.01); *G01S 19/13* (2013.01); *G06Q 20/10* (2013.01)

(58) Field of Classification Search
CPC ........ G01S 19/13; G06N 20/00; G06Q 10/10; G06Q 20/10; G06Q 20/22; G06Q 20/351; G06Q 20/3821; G06Q 30/0601; H04L 12/1822; H04L 12/1827; H04L 65/1069; H04M 1/72457; H04M 3/42374; H04N 7/141; H04N 7/155; H04N 7/17318; H04N 21/4532; H04N 7/142; H04N 7/147; H04N 7/15; H04N 21/2187; H04N 21/4223; H04W 4/00; H04B 1/3805
See application file for complete search history.

(56) References Cited

U.S. PATENT DOCUMENTS

| | | | | |
|---|---|---|---|---|
| 6,396,531 B1 * | 5/2002 | Gerszberg | .......... | H04N 21/4532 348/14.05 |
| 6,507,356 B1 * | 1/2003 | Jackel | .................... | H04N 7/142 348/14.06 |
| 6,510,325 B1 * | 1/2003 | Mack, II | .............. | H04B 1/3805 348/14.02 |
| 7,720,436 B2 * | 5/2010 | Hamynen | .......... | H04N 7/17318 348/14.02 |
| 8,605,132 B1 * | 12/2013 | Swanson | ................ | H04N 7/155 370/260 |
| 8,780,162 B2 * | 7/2014 | Murphy | ................. | H04N 7/141 709/204 |
| 8,970,656 B2 * | 3/2015 | Goodman | ............... | H04W 4/00 455/418 |
| 10,021,344 B2 * | 7/2018 | Farrell | ...................... | H04N 7/15 |
| 12,147,963 B1 * | 11/2024 | Dixon | .................... | G06Q 20/22 |
| 2004/0012613 A1 * | 1/2004 | Rast | .................... | H04N 21/4223 |

(Continued)

*Primary Examiner* — Gerald Gauthier
(74) *Attorney, Agent, or Firm* — The Rapacke Law Group P.A.

(57) ABSTRACT

In some implementations, a system for video calling may include memory; and one or more processors, wherein the one or more processors are configured at least to receive, from a first user device, a request to search for users in a geographical area; determine that one or more user devices are located in the geographical area; receive, from the first user device, a request to video call a second user device of the one or more user devices located in the geographical area; send, to the second user device, the request to video call the second user device; receive, from the second user device, a video stream generated by the second user device; and send, to the first user device, the video stream generated by the second user device.

19 Claims, 32 Drawing Sheets

(56) References Cited

U.S. PATENT DOCUMENTS

| | | | |
|---|---|---|---|
| 2007/0030339 A1* | 2/2007 | Findlay | G06Q 10/10 |
| | | | 348/14.01 |
| 2011/0061085 A1* | 3/2011 | Savard | H04N 21/2187 |
| | | | 725/110 |
| 2011/0283203 A1* | 11/2011 | Periyannan | H04L 12/1827 |
| | | | 715/753 |
| 2012/0321059 A1* | 12/2012 | O'Connor | H04N 7/141 |
| | | | 340/8.1 |
| 2014/0267540 A1* | 9/2014 | Torgersrud | H04M 3/42374 |
| | | | 348/14.01 |
| 2014/0362159 A1* | 12/2014 | Zhai | H04N 7/141 |
| | | | 348/14.01 |
| 2015/0029295 A1* | 1/2015 | Gupta | H04N 7/147 |
| | | | 348/14.01 |
| 2015/0124043 A1* | 5/2015 | Engstrand | H04M 1/72457 |
| | | | 348/14.03 |
| 2015/0256793 A1* | 9/2015 | Pycock | H04L 12/1822 |
| | | | 348/14.07 |
| 2016/0350729 A1* | 12/2016 | Lee | G06Q 30/0601 |
| 2017/0185991 A1* | 6/2017 | Park | G06Q 20/351 |
| 2019/0098692 A1* | 3/2019 | Atarius | H04L 65/1069 |
| 2020/0090192 A1* | 3/2020 | Sim | H04W 4/025 |
| 2021/0049703 A1* | 2/2021 | Ciaglia | G06N 20/00 |
| 2024/0211935 A1* | 6/2024 | Alfeche | G06Q 20/3821 |
| 2025/0220136 A1* | 7/2025 | Gonzalez | H04N 7/141 |

\* cited by examiner

Street address

Apt, suite, etc. (if applicable)

City

State / territory

ZIP code

Enter an interest for the taxpayer or business identified on this form.

Form 1099 delivery

Deliver by mail 
Your form will be mailed to the address above. You'll also get an email when your form is available for download on Airbnb.com.

Deliver electronically only 
We'll notify you by email when an electronic copy of your form is available for download on Airbnb.com. Please read important disclosure information.

Sign and date Form W-9

Under penalties of perjury, I certify that:

1. The number shown on this form is my correct taxpayer identification number (or I am waiting for a number to be issued to me); and 2. I am not subject to backup withholding because: (a) I am exempt from backup withholding, or (b) I have not been notified by the Internal Revenue Service (IRS) that I am subject to backup withholding as a result of a failure to report all interest or dividends, or (c) the IRS has notified me that I am no longer subject to backup withholding; and 3. I am a US citizen or other US person; and 4. The FATCA code(s) entered on this form (if any) indicating that I am exempt from FATCA reporting is correct.

*FIG. 27*

The Internal Revenue Service does not require your consent to any provision of this document other than the certifications required to avoid backup withholding.

Sign and date

Your signature

Date
6-20-2023

Typing your name acts as your signature and certifies that you have capacity to sign for the taxpayer identified on this form

*FIG. 28*

SYSTEMS, METHODS, AND MEDIA FOR VIDEO CALLING BASED ON GPS LOCATION

CROSS-REFERENCE TO RELATED APPLICATIONS

The present application claims priority to U.S. Provisional Application No. 63/546,970 filed Nov. 2, 2023, titled "SYSTEMS, METHODS, AND MEDIA FOR VIDEO CALLING BASED ON GPS," which is hereby incorporated by reference in its entirety.

TECHNICAL FIELD

Embodiments disclosed herein generally relate to systems, methods, and media for video calling.

BACKGROUND

Video calling platforms commonly allow video calling between users that share contact information such as their email address or phone number. Typically, users are video called without regard to their location, and users are not able to send other users any requests that direct them to change orientations or positions of their video cameras.

There is a need in the industry for systems, methods, and media for video calling other users based on their locations, and for sending requests to users requesting them to change the orientations of their video cameras during video calls.

SUMMARY

This summary is provided to introduce a variety of concepts and/or aspects in a simplified form that is further disclosed in the detailed description, below. This summary is not intended to identify key or essential inventive concepts of the claimed subject matter, nor is it intended for determining the scope of the claimed subject matter.

A system of one or more computing devices can be configured to perform particular processes by virtue of having software, firmware, hardware, or a combination thereof installed on the system that in operation causes or cause the system to perform the processes. One or more computer applications can be configured to perform particular processes by virtue of including instructions that, when executed by data processing apparatus, cause the apparatus to perform the processes.

In one general aspect, a system for video calling can include memory; and one or more processors, wherein the one or more processors are configured at least to receive, from a first user device, a request to search for users in a geographical area; determine that one or more user devices are located in the geographical area; receive, from the first user device, a request to video call a second user device of the one or more user devices located in the geographical area; send, to the second user device, the request to video call the second user device; receive, from the second user device, a video stream generated by the second user device; and send, to the first user device, the video stream generated by the second user device. Other embodiments of this aspect include corresponding computer systems, apparatus, and computer programs recorded on one or more computer storage devices, each configured to perform the actions of the methods.

Implementations may include one or more of the following features. The system, wherein the one or more processors are further configured to receive, from the first user device, a first request to change at least a viewing direction of a video camera of the second user device while sending, to the first user device, the video stream generated by the second user device; and send, to the second user device, the first request to change at least the viewing direction of the video camera while sending, to the first user device, the video stream generated by the second user device. Implementations of the described techniques may include hardware, a method or process, or a computer tangible medium.

Implementations may include one or more of the following features. The system, wherein the one or more processors are further configured to not cause a telephone number, email address or user name to be presented on the first user device.

In one general aspect, a method for video calling, can include receiving, from a first user device, a request to search for users in a geographical area; determining that one or more user devices are located in the geographical area; receiving, from the first user device, a request to video call a second user device of the one or more user devices located in the geographical area; sending, to the second user device, the request to video call the second user device; receiving, from the second user device, a video stream generated by the second user device; and sending, to the first user device, the video stream generated by the second user device. Other embodiments of this aspect include corresponding computer systems, apparatus, and computer programs recorded on one or more computer storage devices, each configured to perform the actions of the methods.

Implementations may include one or more of the following features. The method, further comprising receiving, from the first user device, a first request to change at least a viewing direction of a video camera of the second user device while sending, to the first user device, the video stream generated by the second user device; and sending, to the second user device, the first request to change at least the viewing direction of the video camera while sending, to the first user device, the video stream generated by the second user device. Implementations of the described techniques may include hardware, a method or process, or a computer tangible medium.

Implementations may include one or more of the following features. The method, wherein the method does not comprise causing a telephone number, email address or user name to be presented on the first user device.

In one general aspect, a non-transitory computer-readable medium can include one or more instructions that, when executed by one or more processors, cause the one or more processors to perform a method, the method comprising receiving, from a first user device, a request to search for users in a geographical area; determining that one or more user devices are located in the geographical area; receiving, from the first user device, a request to video call a second user device of the one or more user devices located in the geographical area; sending, to the second user device, the request to video call the second user device; receiving, from the second user device, a video stream generated by the second user device; and sending, to the first user device, the video stream generated by the second user device. Other embodiments of this aspect include corresponding computer systems, apparatus, and computer programs recorded on one or more computer storage devices, each configured to perform the actions of the methods.

Implementations may include one or more of the following features. The non-transitory computer-readable medium, wherein the method further comprises receiving, from the first user device, a first request to change at least a viewing direction of a video camera of the second user device while sending, to the first user device, the video stream generated by the second user device; and sending, to the second user device, the first request to change at least the viewing direction of the video camera while sending, to the first user device, the video stream generated by the second user device. Implementations of the described techniques may include hardware, a method or process, or a computer tangible medium.

Implementations may include one or more of the following features. The non-transitory computer-readable medium, wherein the method does not comprise causing a telephone number, email address or user name to be presented on the first user device.

BRIEF DESCRIPTION OF THE DRAWINGS

A complete understanding of the present features or aspects and the advantages and features thereof will be more readily understood by reference to the following detailed description when considered in conjunction with the accompanying drawings wherein:

FIG. 27 illustrates a screenshot of the tax information input interface, according to some embodiments;

FIG. 28 illustrates a screenshot of the tax information input interface, according to some embodiments;

DETAILED DESCRIPTION

Figure 1:
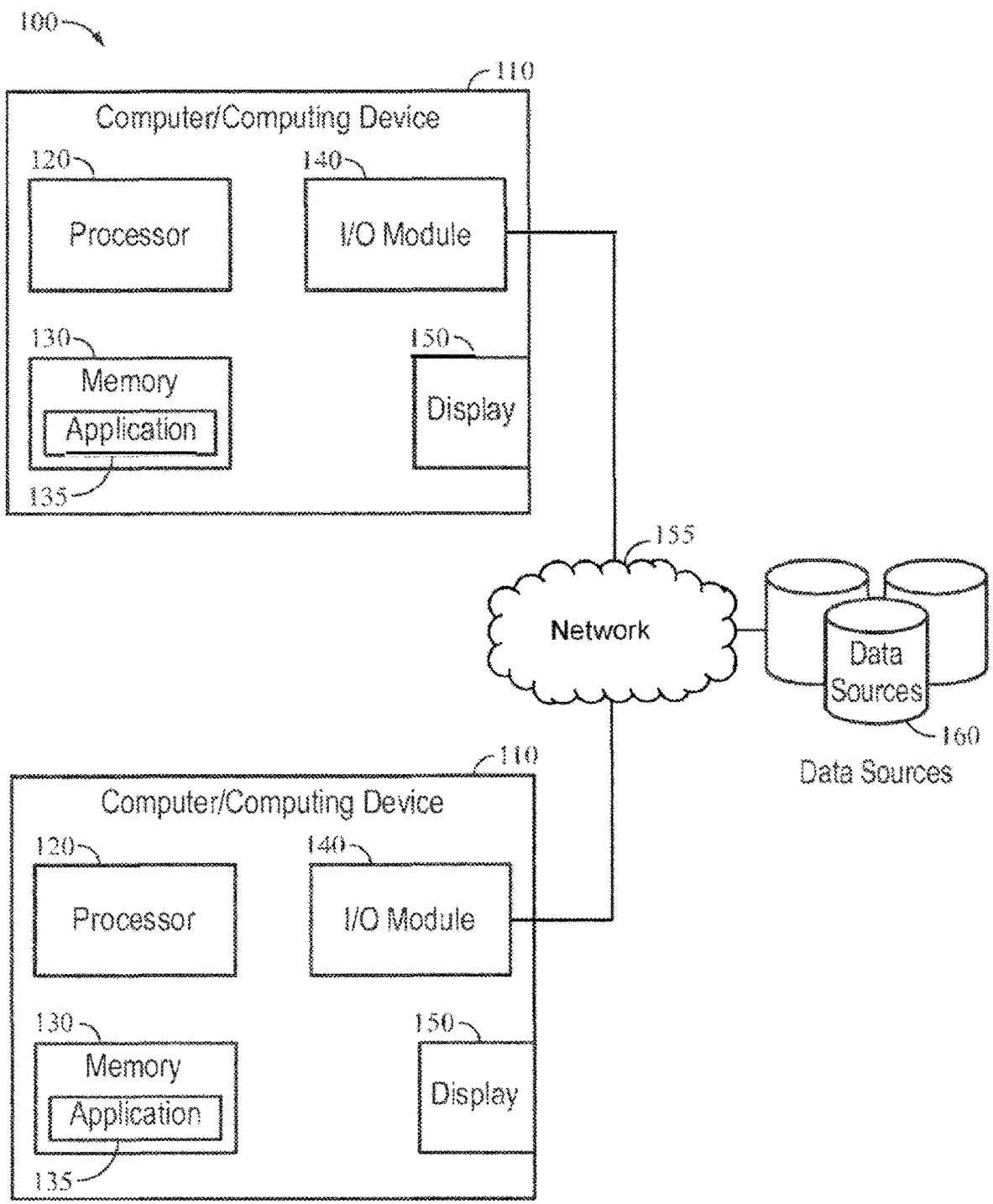
FIG. 1 illustrates a block diagram of a system for video calling, according to some embodiments.

Any specific details of features or aspects are used for demonstration purposes only, and no unnecessary limitations or inferences are to be understood therefrom.

Before describing in detail exemplary aspects, it is noted that the aspects reside primarily in combinations of components and procedures related to the system and/or apparatus. Accordingly, the system and/or apparatus components have been represented where appropriate by conventional symbols in the drawings, showing only those specific details that are pertinent to understanding the aspects of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship, or order between such entities or elements. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary aspects of the inventive concepts defined in the appended claims. Hence, specific steps, process order, dimensions, component connections, and other physical characteristics relating to the aspects disclosed herein are not to be considered as limiting, unless the claims expressly state otherwise. The use or mention of any single element contemplates a plurality of such element, and the use or mention of a plurality of any element contemplates a single element (for example, "a device" and "devices" and "a plurality of devices" and "one or more devices" and "at least one device" contemplate each other), regardless of whether particular variations are identified and/or described, unless impractical, impossible, or explicitly limited.

FIG. 1 illustrates system 100 for video calling. according to one or more aspects. Various features described within FIG. 1 may generally complement the description of the other figures of the present disclosure. The system 100 for video calling includes one or more computing devices 110, which includes one or more processors 120, memory 130, one or more applications 135, one or more input/output modules (or "I/O modules") 140 connected directly or through a network 155 to data sources 160, and one or more displays 150. The one or more computing devices 110 are communicatively connected to each other through the network 155.

In each computing device 110, a processor 120 is wired and/or wirelessly connected to and/or communicatively connected to the memory 130 and the I/O module 140. The I/O module 140 is wired and/or wirelessly connected to and/or communicatively connected to the display 150 and the network 155 and/or to the data sources 160. A computing device 110 can be a computer. A computing device 110 can be or be integrated in another device, e.g., a mobile telephone, a smartphone, a tablet, a laptop, server, desktop computer, a personal digital assistant (PDA), a portable storage device (e.g., a universal serial bus (USB) flash drive), and/or the like. Likewise, one or more computing devices 110 may become a system 100 for video calling via the execution of one or more applications such as the one or more applications 135.

The processor 120 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor 120 may be any technically feasible hardware unit capable of processing data and/or executing software applications such as the one or more applications 135. Further, in the context of this disclosure, the computing elements shown in the computing device 110 may correspond to a physical computing system (e.g., a local or networked computing device) or may be a virtual computing instance executing within a computing cloud.

Memory 130 includes a random-access memory (RAM) module, a read-only memory (ROM) module, a flash memory unit, a hard disk, magnetic disks, optical disks, magneto-optical disks, a mass storage device, a database, and/or any other type of memory unit or combination thereof. Processor 120 and I/O module 140 are configured to read instructions and/or data from and write instructions and/or data to memory 130 and/or the data sources 160. Memory 130 stores various software programs that can be executed by processor(s) 120 and application data associated with said software programs, including software that runs methods, steps, and processes such as the software, methods, steps, and/or processes described in this disclosure. The various software programs and the associated application data include the one or more applications 135.

The one or more applications 135 are configured to implement aspects and processes described herein. The memory 130 and the data sources 160 store data accessible by the one or more applications 135. According to one or more aspects, the one or more applications 135 may include software elements corresponding to one or more of the various aspects described herein. For example, the one or more applications 135 may be implemented in various aspects using any desired programming language, scripting language, or combination of programming languages and/or scripting languages (e.g., C, C++, C#, PYTHON®, JAVA®, JAVASCRIPT®, PERL®, and/or the like). Furthermore, the code, instructions, data, functionality, and/or results from processing and/or execution of the one or more applications 135 can vary according to the person or use of the system, the data available, the one or more computing devices 110 and/or user running the application (for example, the one or more applications 135 in a server, an administrator computer, a staff/employee computer, and a client or user computer), the role of the user and/or the device (for example, the user of a computer running the application(s) 135 as an administrator then switching and using the computer running the application(s) 135 as a client), and/or the like. Therefore, the one or more applications 135 may have aspects that operate in different computing devices that may or may not be connected to each other and/or to the same network(s). The one or more applications 135 can include map software that communicates with a global positioning system (GPS) and financial software (with e.g., Stripe) for payment processing. Aspects of the one or more applications 135 are further described in the description of FIGS. 2-36, below.

The I/O module 140 provides the hardware, firmware, and/or software for the computing device 110 to interact with other components and devices, including the data sources 160, the display 150, the network 155, other devices connected to the network 155, and/or the like. According to one or more aspects, the I/O module 140 can be connected to other devices, either wired or wirelessly, including input peripherals such as keyboards, one or more microphones, one or more cameras (e.g., one or more video cameras), and/or the like. According to one or more aspects, the I/O module 140, automatically and/or manually via user input through the display 150 and/or via the network 155, request, obtain, get, post, put, create, read, update, and/or delete any information and/or data from other computers and/or devices connected to the network 155. The processor 120, through the I/O module 140, actuates, creates, generates, sends, and/or receives signals and/or data to and/or from the network 155 and/or the display 150. The I/O module 140 is configured to allow data to be exchanged between the computing device 110 and other devices attached to a network 155, such as other computer systems, cloud services, remote databases, and/or the like. According to one or more aspects, the I/O module 140 supports communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol, including WAN, LAN, Wi-Fi®, Bluetooth®, and/or the like.

Cloud services are any networked, online, internet, and/or web services that may be implemented or used to perform as or embody part or all of the one or more computing devices 110 and/or to execute part or all of the one or more applications 135, handle and/or store the data accessed by the one or more applications 135, via provisioning software, Software-as-a-Service (SaaS), platform, Platform-as-a-Service (PaaS), infrastructure, Infrastructure-as-a-Service (IaaS), artificial intelligence models and/or processing, Artificial Intelligence-as-a-Service (AIaaS), and/or other technologies, such as Amazon Web Services (AWS®), Microsoft® Azure®, Google Cloud Platform (GCP®), Snowflake®, Heroku®, Netlify®, DigitalOcean®, IBM® Cloud, Oracle® Cloud Infrastructure, and/or the like.

The display 150 includes devices capable of providing input, such as a touchscreen, touch sensitive display, keyboard, a mouse, a smart pen, one or more cameras, buttons, a microphone, a headphone, a headset, photosensors, biosensors, haptic sensors, and so forth, as well as devices capable of providing output, such as a display device, a touchscreen, a touch sensitive display, a speaker, headphone, a headset, touchscreen, haptic transducer, LED's, and so forth. Additionally, the display 150 may include devices capable of both receiving input and providing output, such as a touchscreen, a touch sensitive display, haptic devices, a universal serial bus (USB) port, and so forth. The display 150 may be configured to receive various types of input from a user, such as verbal commands, typed input, gestures, sounds, and so forth, and to also provide various types of output to the user, such as displayed digital images, digital videos, sound, text, alarms, reminders, haptic sensations, and so forth. According to one or more aspects, the display 150 (or part of the display 150) is embedded and/or integrated with the computing device 110. For example, the computing device 110 may have the display 150 on the housing that encloses the computing device 110. According to one or more aspects, the display 150 (or part of the display 150) is separate from (is not embedded and/or integrated with) the computing device 110. For example, the computing device 110 may have the display 150 separate from the housing that encloses the computer 110, while connected wirelessly to the computer 110 via Bluetooth® or another wireless protocol.

The computing devices 110 and/or the data sources 160 may be local, remote, cloud-based, implemented via cloud services, shared, dedicated, and/or the like. The data sources 160 includes a computing device, a database, a data warehouse, a data lake, a data repository, a file storage, RAM, ROM, flash memory, and/or the like. The data sources 160 can be or include any database technologies and/or any database management system (DBMS), including hierarchical, network, relational, object-oriented, sql, no-sql, graph, ER model, and/or document databases and/or DBMSs, and/or the like. Throughout the description of the various aspects, it should be understood that the memory 130 and/or the data sources 160 store and allow reading, writing, editing, and/or deleting of any data, values, information, parameters, and/or the like, for the operation of the computing devices 110, one or more applications 135, and/or the system 100 for video calling. According to one or more aspects, the data sources 160 is a plurality of databases. According to one or more aspects, the data sources 160 is implemented or resides partially or completely inside of the one or more computing devices 110 and/or are accessible to the computing devices 110 and/or the one or more applications 135 via the network 155.

The network 155 includes any technically feasible type of communications network that allows data to be exchanged between the one or more computing devices 110 and external entities or devices. For example, network 155 may include a wide area network (WAN), a local area network (LAN), a wireless (Wi-Fi®) network, Bluetooth®, and/or the Internet, among others (including any communication channel, medium, and/or network accessible by the I/O module 140). According to one or more aspects, the I/O module 140 is not directly connected to one or more elements, parts, components, devices and/or networks. According to one or more aspects, the I/O module 140 connects wired and/or wirelessly to the to one or more elements, parts, components, devices and/or networks through the network 155.

Also, any connection may be associated with a computer-readable medium or media. For example, the one or more applications 135 and/or data associated with or operated by the one or more applications 135 may be transmitted from or through a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave, all of which are included in the definition of medium. Storage of any kind data of the one or more applications 135 and/or data associated with or operated by the one or more applications 135 such as hard discs, disks, RAM, ROM, flash memory, cloud storage, and/or the like (including the memory 130 and/or the data sources 160) is also included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media. The computer-readable medium can be transitory or non-transitory.

The data sources 160 include one or more databases or electronic sources of data associated with video calling. Data associated with video calling can include any data, whether historic data, real-time data, delayed data, stored data, and/or the like, about video calls, including any registered user accounts and associated profile information.

FIGS. 2-36 illustrate various aspects of a user interface of the system 100, according to some embodiments.

Figure 2:
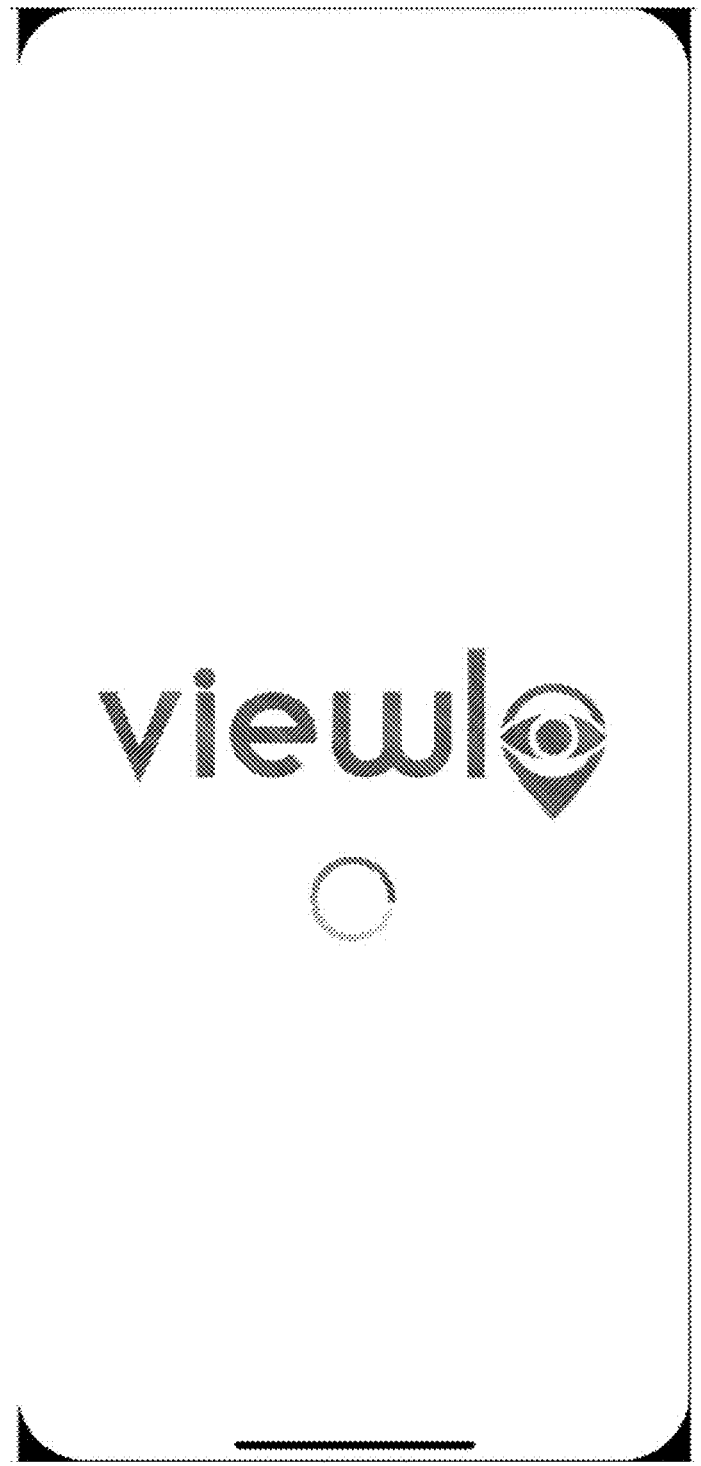
FIG. 2 illustrates a screenshot of the application home screen, according to some embodiments.

FIG. 2 illustrates a user interface of a system 100 in response to executing the one or more applications 135, according to some embodiments. In some embodiments, the user interface can be generated by one or more computing devices. In some embodiments, the one or more computing devices can cause the user interface (and e.g., any of its text, graphical elements, including images, indicators, icons, etc.) to be presented on any of the one or more computing devices. For example, at least one computing device can send at least a request for data to at least one other computing device. In response, the at least one other computing device can send data and/or instructions to the at least one computing device to cause the user interface to be presented on the at least one computing device. As another example, the at least one computing device can present the user interface without sending any requests to another computing device. In some embodiments, the user interface can be presented on, for example, a first computing device (e.g., a first user device).

In some embodiments, in response to executing the one or more applications 135, the user interface can present the name of the one or more applications 135, a company logo, or any other suitable representation desired.

Figure 3:
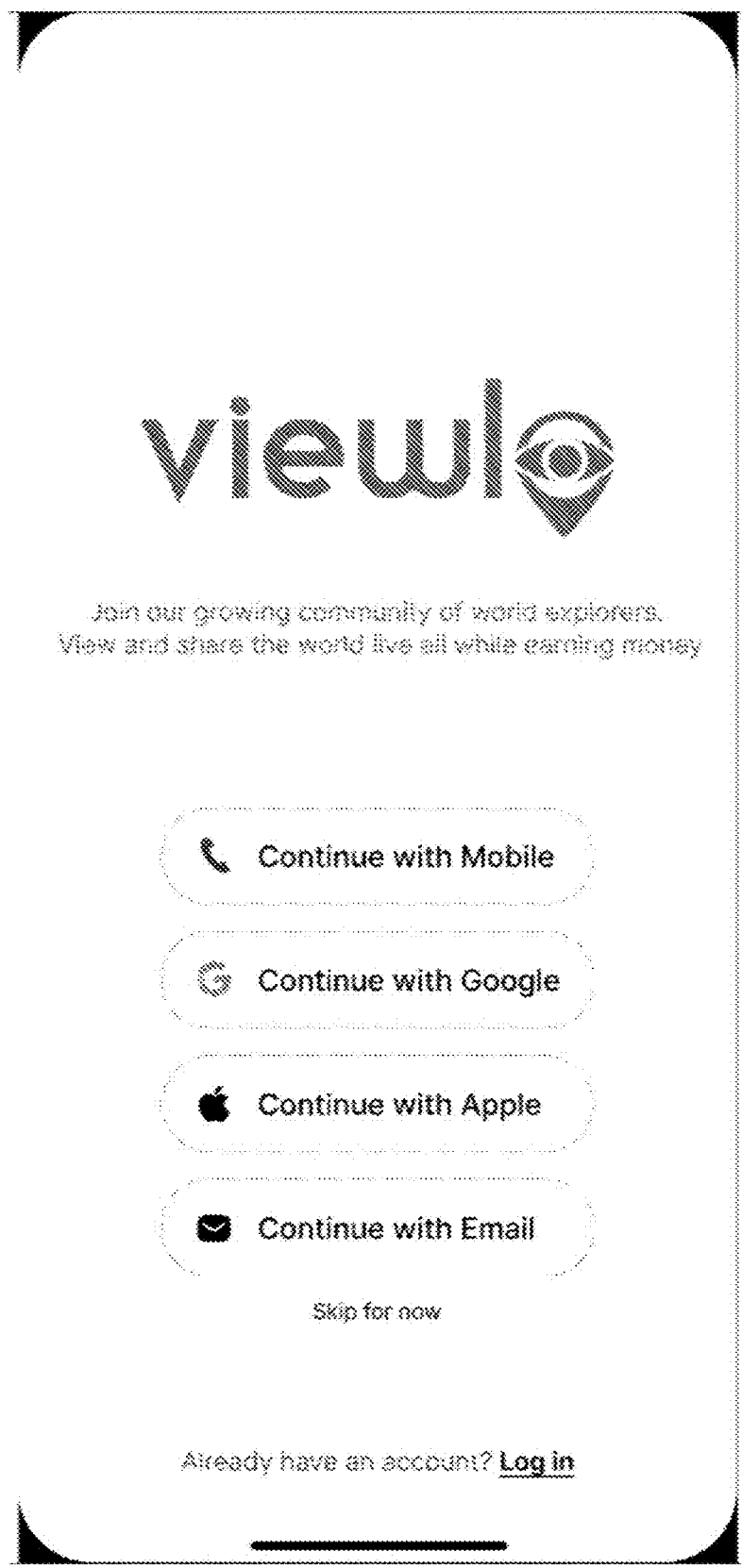
FIG. 3 illustrates a screenshot of the application home screen interface, according to some embodiments.

FIG. 3 illustrates that the system 100 allows users to create user accounts and provide login credentials for authentication.

Figure 4:
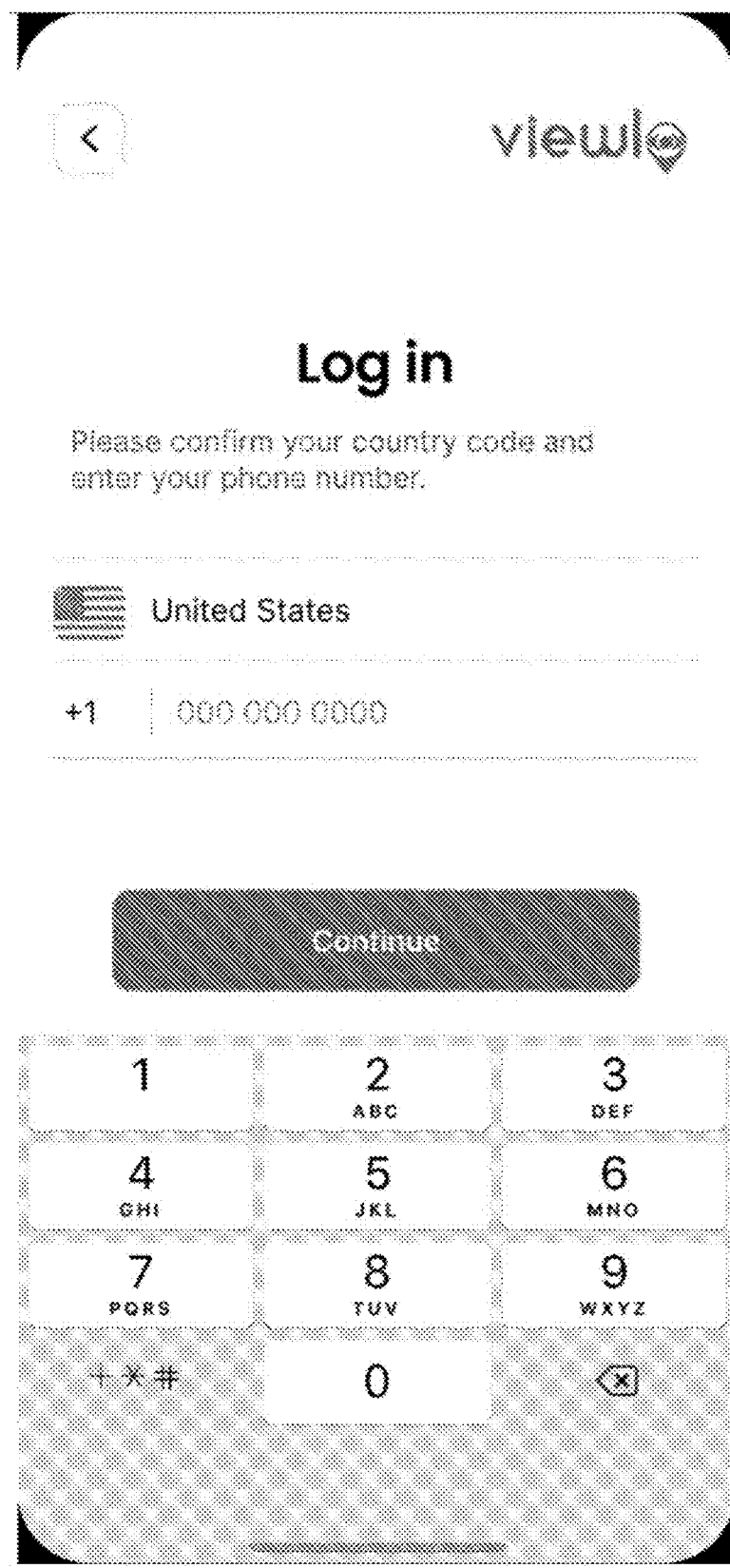
FIG. 4 illustrates a screenshot of the log in interface, according to some embodiments.

FIG. 4 illustrates that the system 100 allows any user to create a user account by providing their phone number.

Figure 5:
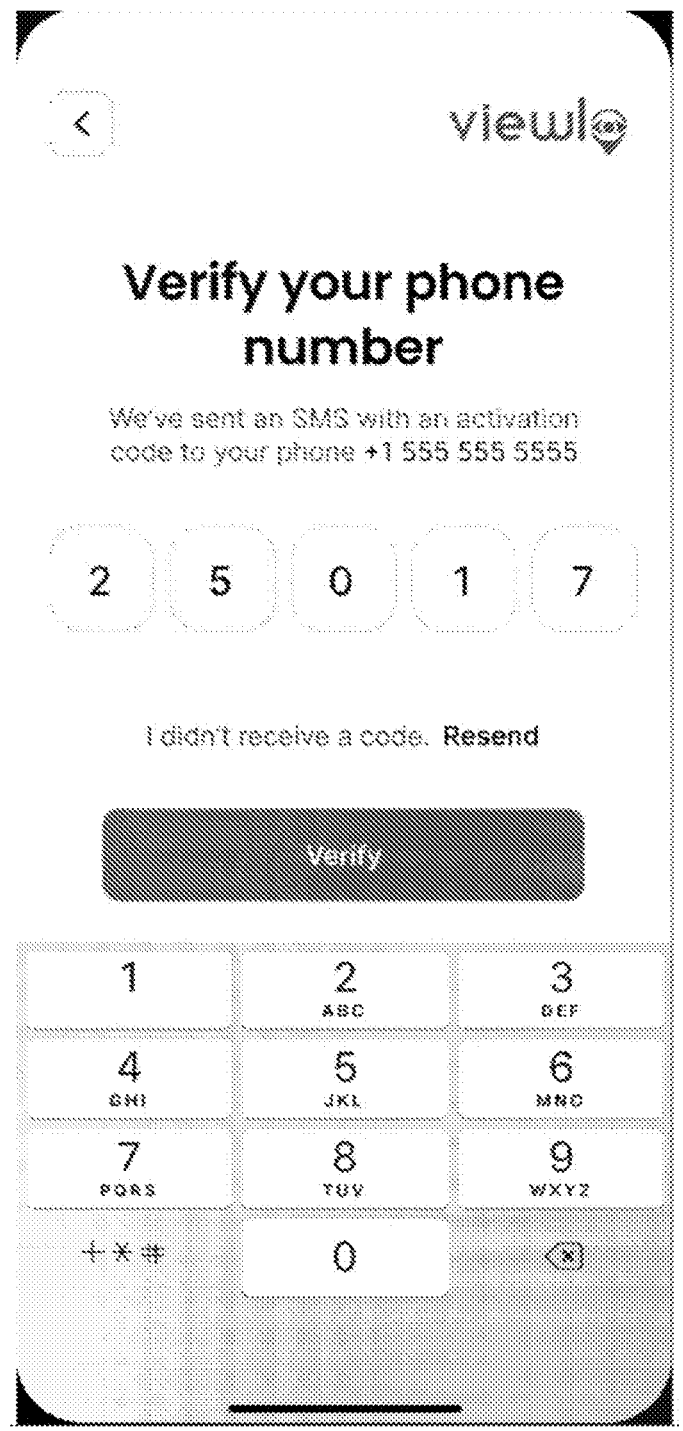
FIG. 5 illustrates a screenshot of the phone number verification interface, according to some embodiments.

FIG. 5 illustrates that a user can login to their user account by providing a phone number to, for example, the first computing device. In response to receiving the phone number, the first computing device can send the phone number to at least a second computing device (e.g., a server). In response to receiving the phone number, the second computing device can send a message (e.g., a text message) to the first computing device, wherein the message includes a code. The user can provide the first computing device with the code, be authenticated, and login to their user account.

Figure 6:
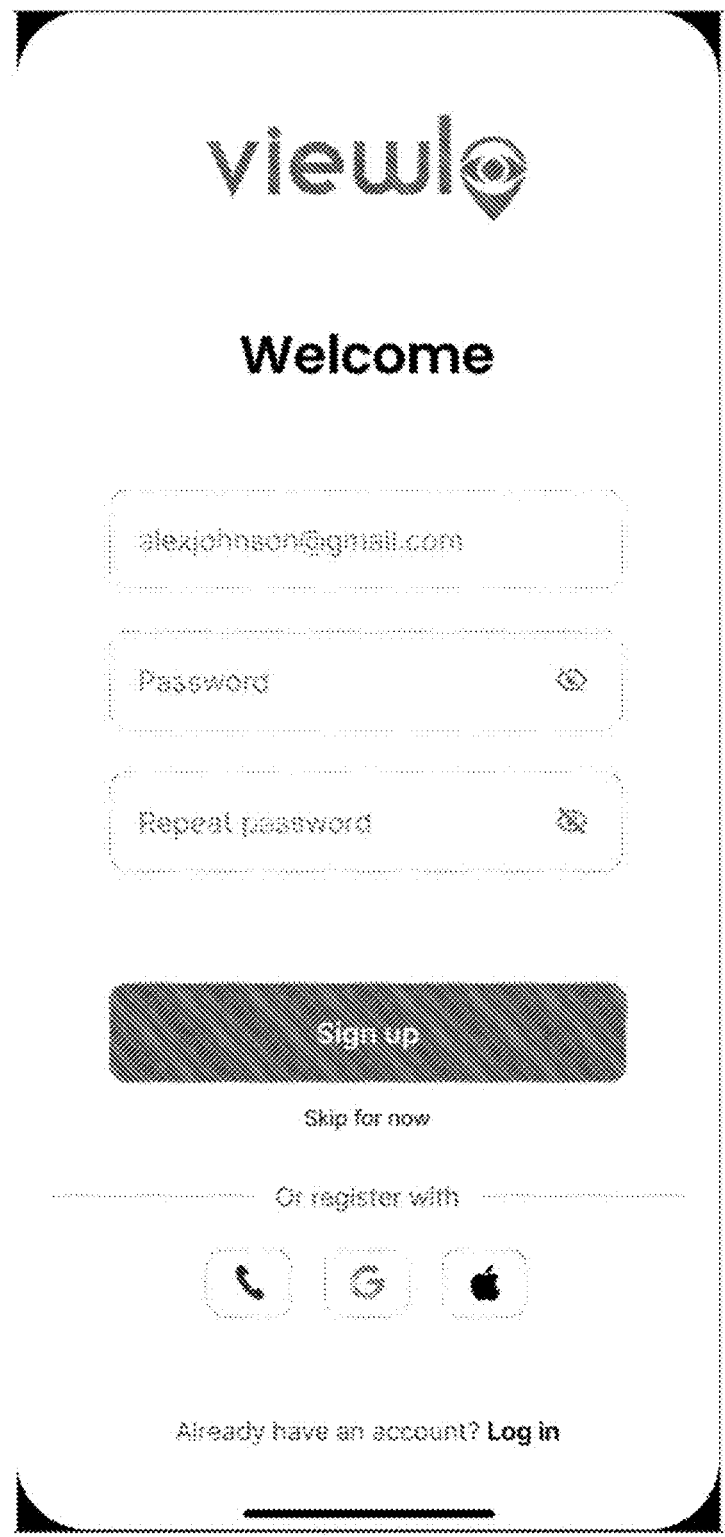
FIG. 6 illustrates a screenshot of the log in interface, according to some embodiments.

FIG. 6 illustrates that the system 100 allows any user to create a user account by providing their email address and password.

Figure 7:
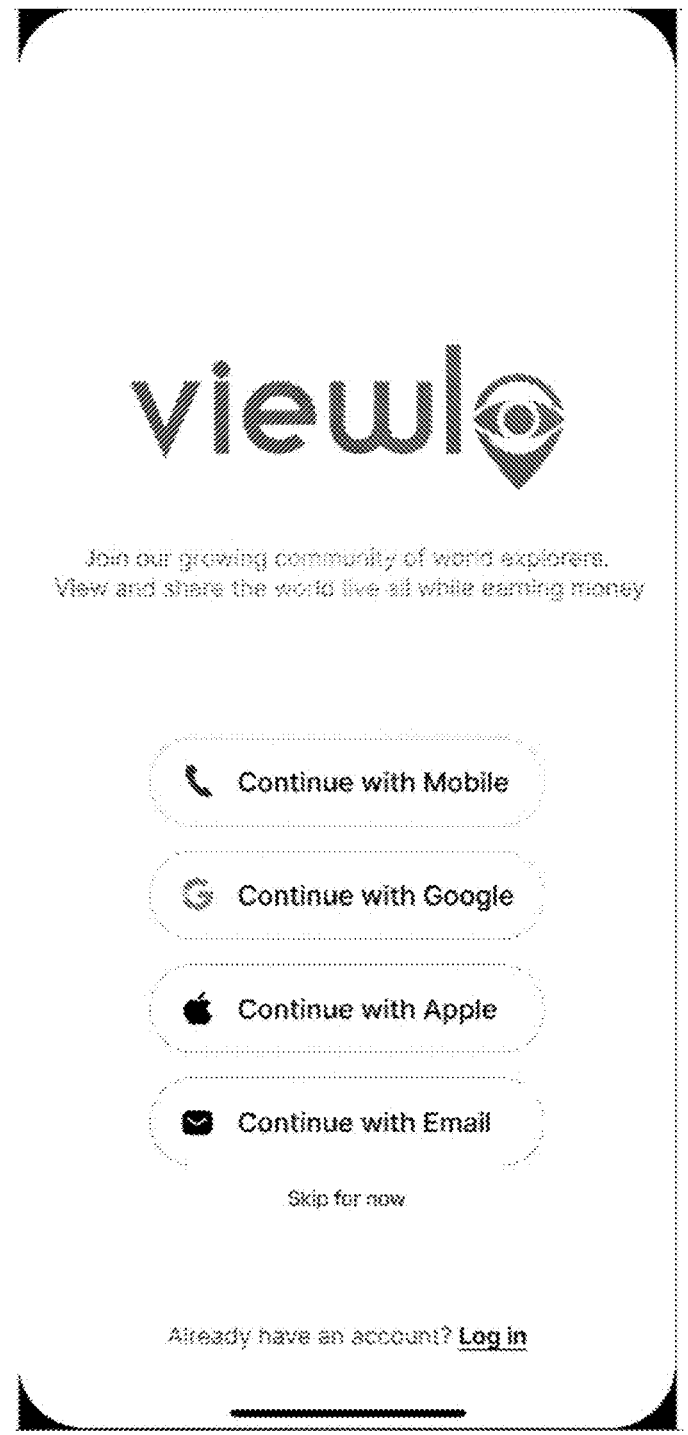
FIG. 7 illustrates a screenshot of the log in credential interface, according to some embodiments.

FIG. 7 illustrates that a user can login to their user account by providing an email address and password, by providing their phone number, by logging in through GOOGLE, or by logging in through APPLE.

Figure 8:
FIG. 8 illustrates a screenshot of the password reset interface, according to some embodiments.

FIG. 8 illustrates that the system 100 allows a user to reset their password by providing their email address or phone number.

Figure 9:
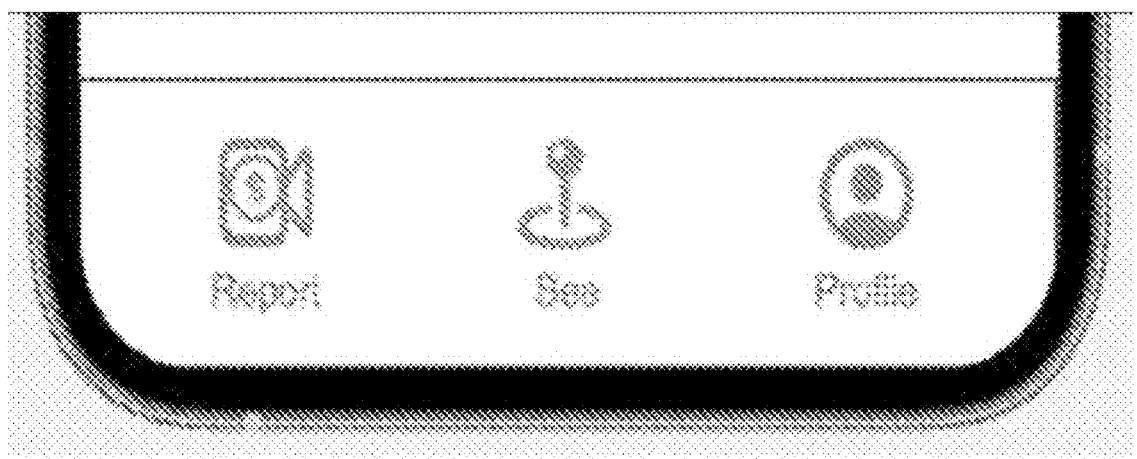
FIG. 9 illustrates a partial screenshot of the application options interface, according to some embodiments.

FIG. 9 illustrates that the user interface can provide an option to enter a reporting mode. The user interface can further provide an option to enter a calling mode. The user interface can further provide an option to view, edit, or delete their profile information.

Figure 10:
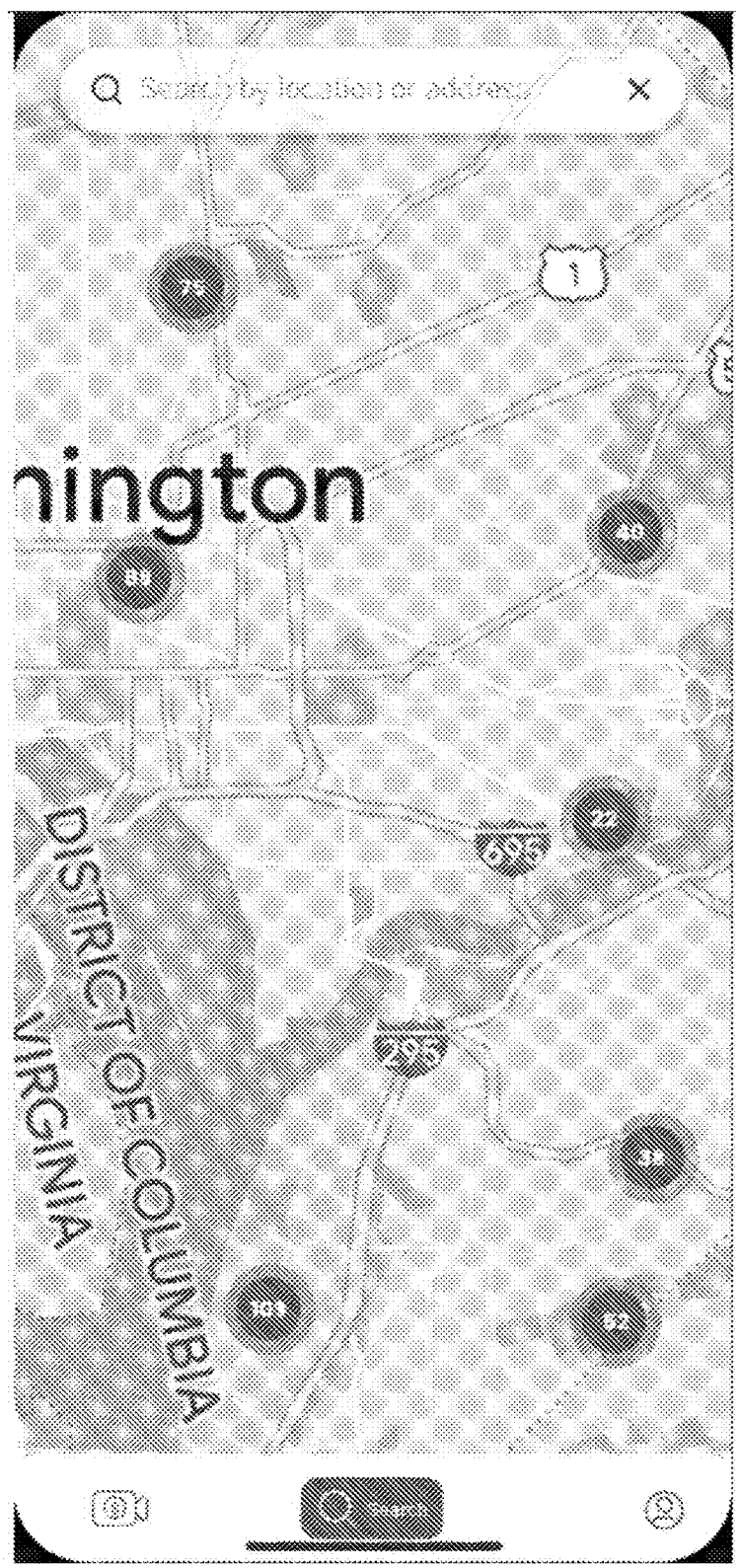
FIG. 10 illustrates a screenshot of the home screen map interface, according to some embodiments.

FIG. 10 illustrates that, in response to receiving a selection of the option to enter the calling mode, the system 100 can search for other computing devices (e.g., other user devices) that are generating and sending video streams. In some embodiments, the system 100 can cause a map and positional indicators thereon to be presented on the first computing device. In some embodiments, the positional indicators can indicate at least approximate locations at which other users and their respective computing devices are located. The map can represent a geographical area, and can include any suitable geographical features, structures, landmarks, etc. Each at least approximate location can be determined by using any suitable system or method, such as, for example, a global positioning system (GPS), cellular triangulation, Wi-Fi positioning, internet protocol geolocation, etc. In some embodiments, each at least approximate location can be an approximate location or an exact location of a respective computing device. In some embodiments, each positional indicator can include a numerical indicator indicating a number of users and/or user devices at a respective approximate location.

In some embodiments, the system 100 can allow a user to search for other computing devices based on location (e.g., by city, district, address, zip code, etc.). In response to receiving user input indicating a location, the system 100 can present a map approximately centered at the location. In some embodiments, the system 100 can allow users to provide user input indicating a business or company name, a landmark, an event (e.g., a concert), a tourist attraction, etc. In response to receiving user input indicating a business or company name, a landmark, an event (e.g., a concert), a tourist attraction, etc., the system 100 can cause a map approximately centered at the location of the business or company name, landmark, event, tourist attraction, etc. to be presented on the first computing device. In some embodiments, the system 100 can allow users to change a size of the geographical area represented by the map based on user input. For example, a user can zoom in to reduce the size of the geographical area represented by the map while the size of the map remains unchanged. A user can zoom out to increase the size of the geographical area represented by the map while the size of the map remains unchanged. In other embodiments, a user can provide input to indicate the size of the geographical area. For example the input can indicate that the geographical area radially extends 1 mile, 2 miles, 3 miles, etc. from any location.

Figure 11:
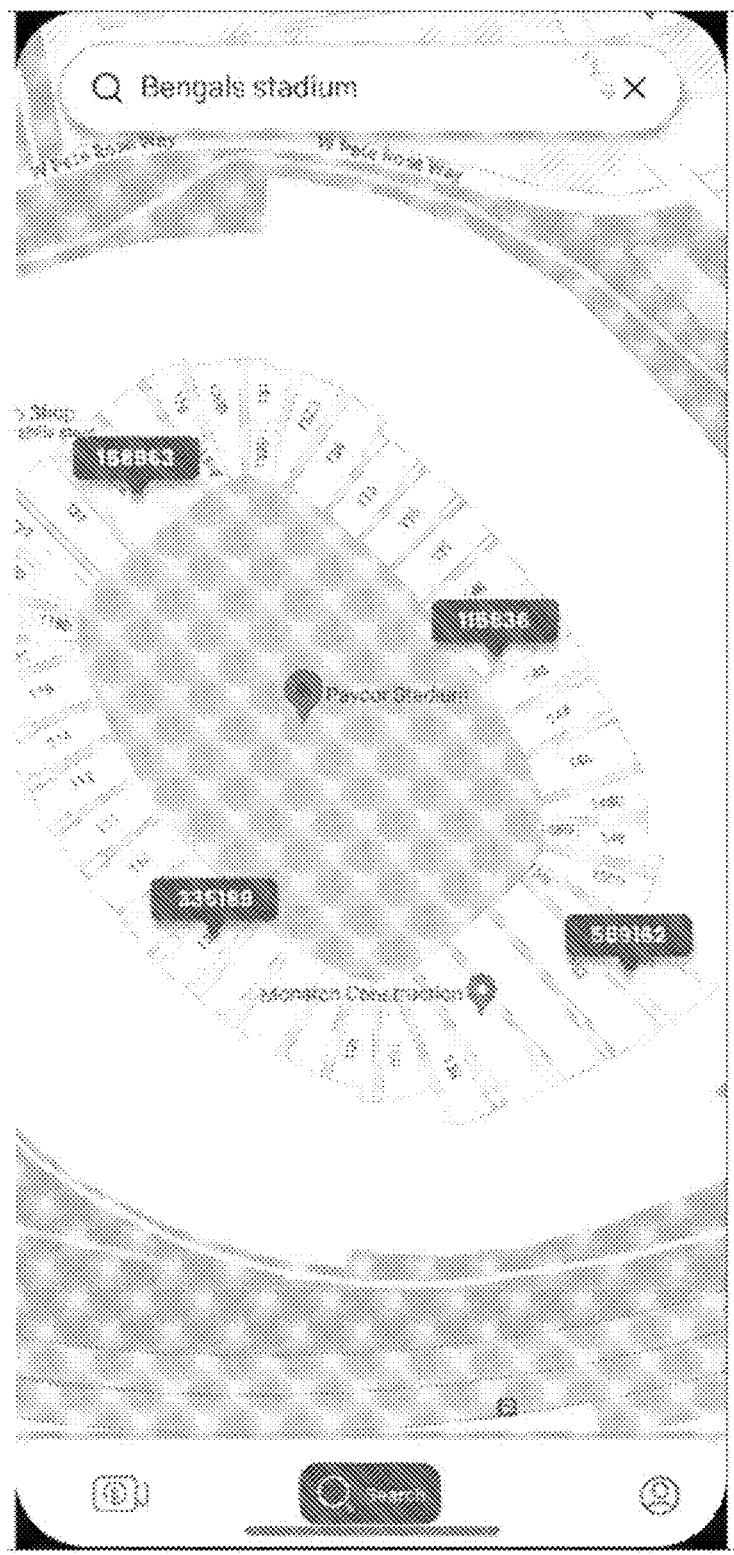
FIG. 11 illustrates a screenshot of the map interface, wherein the caller is able to view a detailed, zoomed view based on the search results, according to some embodiments.

FIG. 11 illustrates that, in some embodiments, when zoomed in, each positional indicator can include a unique identification number for a respective user account. In some embodiments, when zoomed in, each positional indicator is positioned on the map based on a more precise location (e.g., an exact location) of a respective computing device.

Figure 12:
FIG. 12 illustrates a screenshot of the map interface wherein the user has selected an active reporter, according to some embodiments.

FIG. 12 illustrates that, in response to receiving a selection of a positional indicator, an option to video call a third computing device (e.g., another user device) associated with the positional indicator can be presented. In some embodiments, a unique identification number of a respective user account associated with the third computing device, a user rating of the respective user account, a type of the third computing device (e.g., IPHONE, ANDROID, etc), a model number of the third computing device, a location (e.g., address) of the third computing device, any name associated with the location, a note in the form of text or graphical icons entered by the third computing device, or any combination thereof, can be presented.

Figure 13:
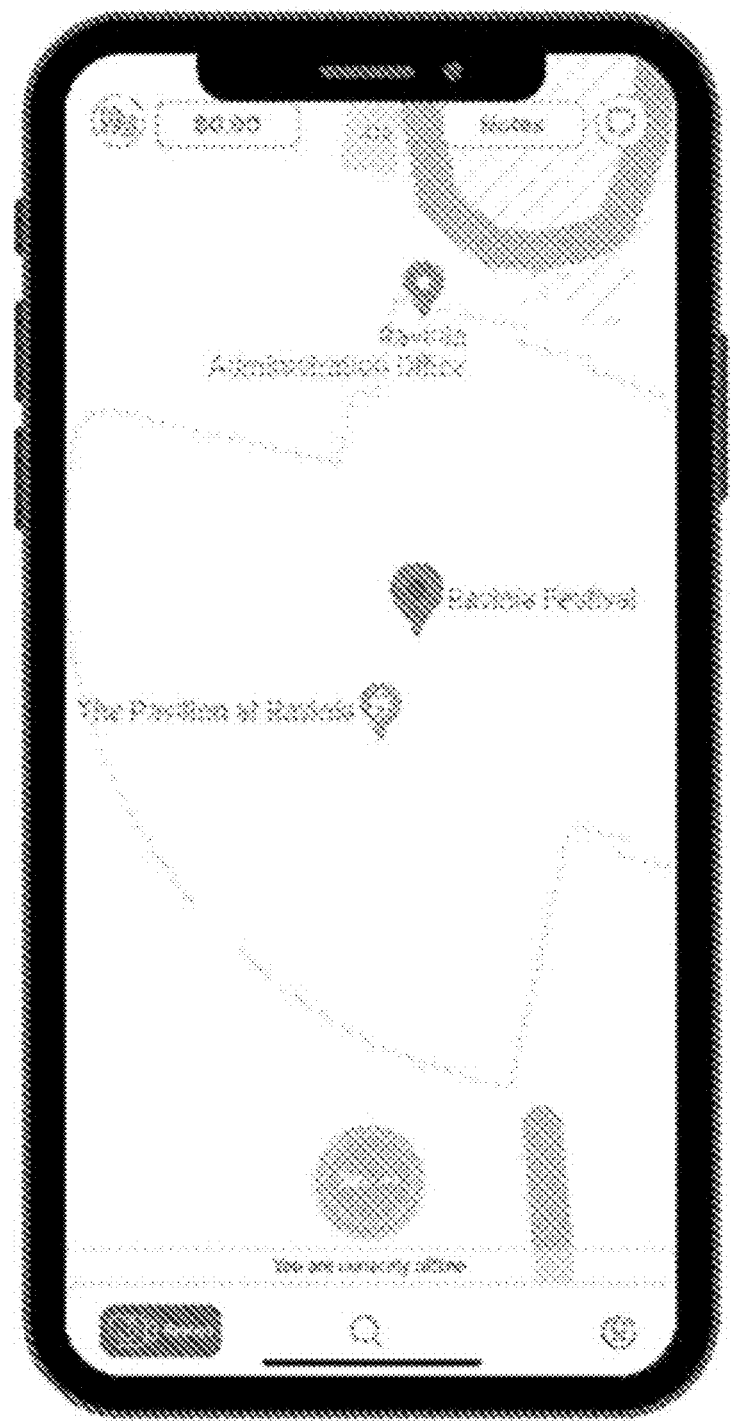
FIG. 13 illustrates a screenshot of the map interface, according to some embodiments.

FIG. 13 illustrates that in response to receiving a selection of the option to enter the reporting mode from the third computing device, the system 100 can cause a map and at least one positional indicator thereon to be presented on the third computing device. The positional indicator can indicate at least an approximate location on the map at which the third computing device is located. In some embodiments, the system 100 can present an option to generate and send a video stream to one or more other computing devices, including for example, one or more servers, one or more user devices, or any combination thereof. In some embodiments, the system 100 can present an offline indicator indicating that the third computing device is not generating and sending a video stream to one or more other computing devices. In some embodiments, the system 100 can present an earned balance of the user account associated with the third computing device. The earned balance can indicate an amount of money earned for generating and sending video streams to one or more other computing devices. In some embodiments, the system 100 can present a note associated with the third computing device. The note is entered by the third computing device user to indicate additional information related to their location to one or more other computing device.

In some embodiments, in response to receiving a selection of the option to generate and send a video stream to one or more other computing devices, the system 100 can generate and send a video stream to one or more other computing devices. In some embodiments, any of the other computing devices can receive the video stream. In some embodiments, any computing device that received the video stream can send the video stream to any other computing device and cause the video steam to be presented on any other computing device.

In some embodiments, in response to receiving a selection of the option to generate and send a video stream to one or more other computing devices, the system 100 can present an online indicator indicating that the third computing device is generating and sending a video stream to one or more other computing devices. In some embodiments, the video stream can be generated by the third computing device, and the system 100 can send the video stream to one or more other computing devices. In some embodiments, the system 100 can present the video stream on the third computing device. In some embodiments, the system 100 can present an option to stop generating and sending the video stream to one or more other computing devices. In response to receiving a selection of the option to stop generating and sending the video stream to one or more other computing devices, the system 100 can stop generating and sending the video stream to one or more other computing devices.

Figure 14:
FIG. 14 illustrates a screenshot of the active reporter's camera view interface, according to some embodiments.

FIG. 14 illustrates that in response to receiving, from the first computing device, a selection of the option to video call the third computing device, in response to sending, to the third computing device, a request to video call the third computing device, and in response to receiving, from the third computing device, an acceptance of the request to video call the third computing device, the system 100 can receive the video stream from the third computing device. In some embodiments, the system 100 can send the video stream to at least the first computing device. In some embodiments, the system 100 can encrypt the video stream before sending the encrypted video stream to at least the first computing device. In some embodiments, the system 100 can cause the video stream to be presented on at least the first computing device. The video stream can be based at least on video information (e.g., visual information, audio information, etc.) captured by a video camera of the third computing device. In some embodiments, any of the one or more computing devices can receive the video stream from the third computing device and send the video stream to at least the first computing device.

In some embodiments, the system 100 can present an option to end the video call. In response to receiving a selection of the option to end the video call, the system 100 can stop generating the video stream on the third computing device. The system 100 can stop sending the video stream to at least the first computing device.

In some embodiments, the system 100 can present an option to mute a microphone on the third computing device. In response to receiving a selection of the option to mute the microphone on the third computing device, the system 100 can generate the video stream on the third computing device without any audio information.

In some embodiments, the system 100 can present an option to mute a speaker on the first computing device. In response to receiving a selection of the option to mute the speaker on the first computing device, the system 100 can present the video stream on the first computing device without any audio.

In some embodiments, the system 100 can present an option to send a request to change at least an orientation of a video camera of the third computing device. In some embodiments, the option to send the request to change at least the orientation of the video camera can include an option to send a request to change at least a viewing direction of the video camera of the third computing device. In some embodiments, the option can indicate a direction to which the viewing direction is requested to be changed. For example, the option can include a directional arrow indicating that the viewing direction is requested to be changed to the left, to the right, upward, or downward. In response to receiving a selection of the option, the system 100 can send, at least to the third computing device, the request to change at least the orientation of the video camera of the third computing device. The request can indicate the direction to which the viewing direction is requested to be changed.

In some embodiments, the system 100 can present an option to send a request to change a position of a video camera of the third computing device. The option can indicate a position to which the video camera is requested to be moved. For example, the option can include a directional arrow indicating that the video camera is requested to be moved: to the left, to the right, forward, or backward. In response to receiving a selection of the option, the system 100 can send, at least to the third computing device, the request to change the position of the video camera of the third computing device. The request can indicate the position to which the video camera is requested to be moved.

In some embodiments, the system 100 can present an option to send a request to obtain a 360 degree view. In response to receiving a selection of the option, the system 100 can send the request to obtain a 360 degree view to at least the third computing device. The request can indicate that the video camera is requested to be rotated by 360 degrees.

In some embodiments, the system 100 can present an option to send a request to zoom in or zoom out. In response to receiving a selection of the option, the system 100 can send the request to zoom in or zoom out to the third computing device. The request can indicate that the video camera is requested to zoom in or zoom out.

FIG. 14 illustrates that in response to the third computing device receiving a request to change a viewing direction of the video camera, position of the video camera, zoom in, zoom out, or obtain a 360 degree view, the system 100 can present, on the third computing device, an indicator indicating the direction to which the viewing direction is requested to be changed, the position to which the video camera is requested to be moved, the request to zoom in, the request to zoom out, or the request to obtain a 360 degree view.

In some embodiments, the system 100 can allow a user of the third computing device to select an indicator. In response to receiving a selection of the indicator, the system 100 can send a notification to the first computing device indicating that the request was not accepted by the user of the third computing device. In response to receiving, by the first computing device, the notification, the system 100 can present, on the first computing device, an indicator indicating that the request was not accepted by the user of the third computing device. In some embodiments, the indicator can indicate (by e.g., changing color or size) the requested direction to which the viewing direction is not able to be changed, the requested position to which the video camera is not able to be moved, or that the video camera is not able to be rotated by 360 degrees.

Figure 15:
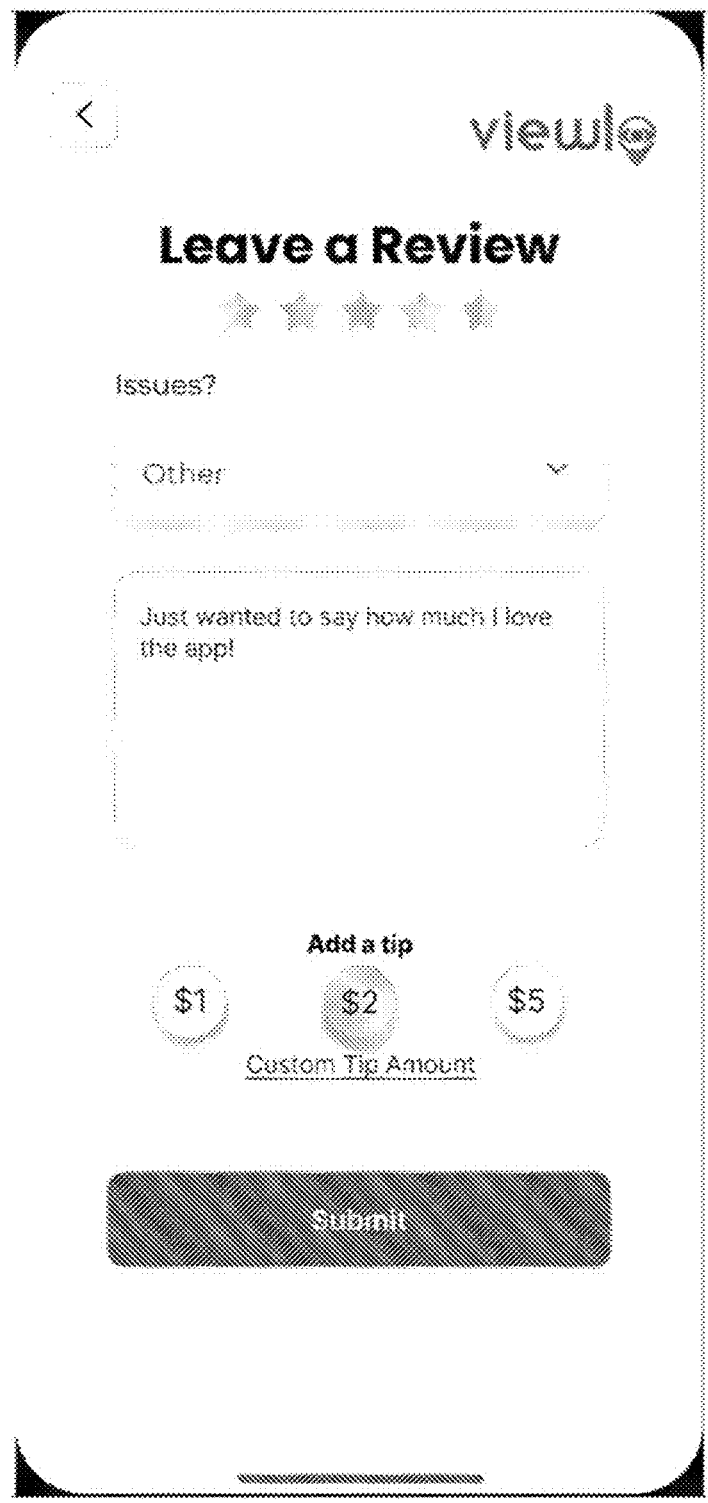
FIG. 15 illustrates a screenshot of the review interface, according to some embodiments.

FIG. 15 illustrates that the system 100 can allow a user of the first computing device to rate a user of the third computing device on any suitable scale, such as, for example, a scale of 1 to 5. The system 100 can allow a user to identify any issues with the video call. The system 100 can allow a user of the first computing device to send an amount of money to a user account associated with the third computing device.

Figure 16:
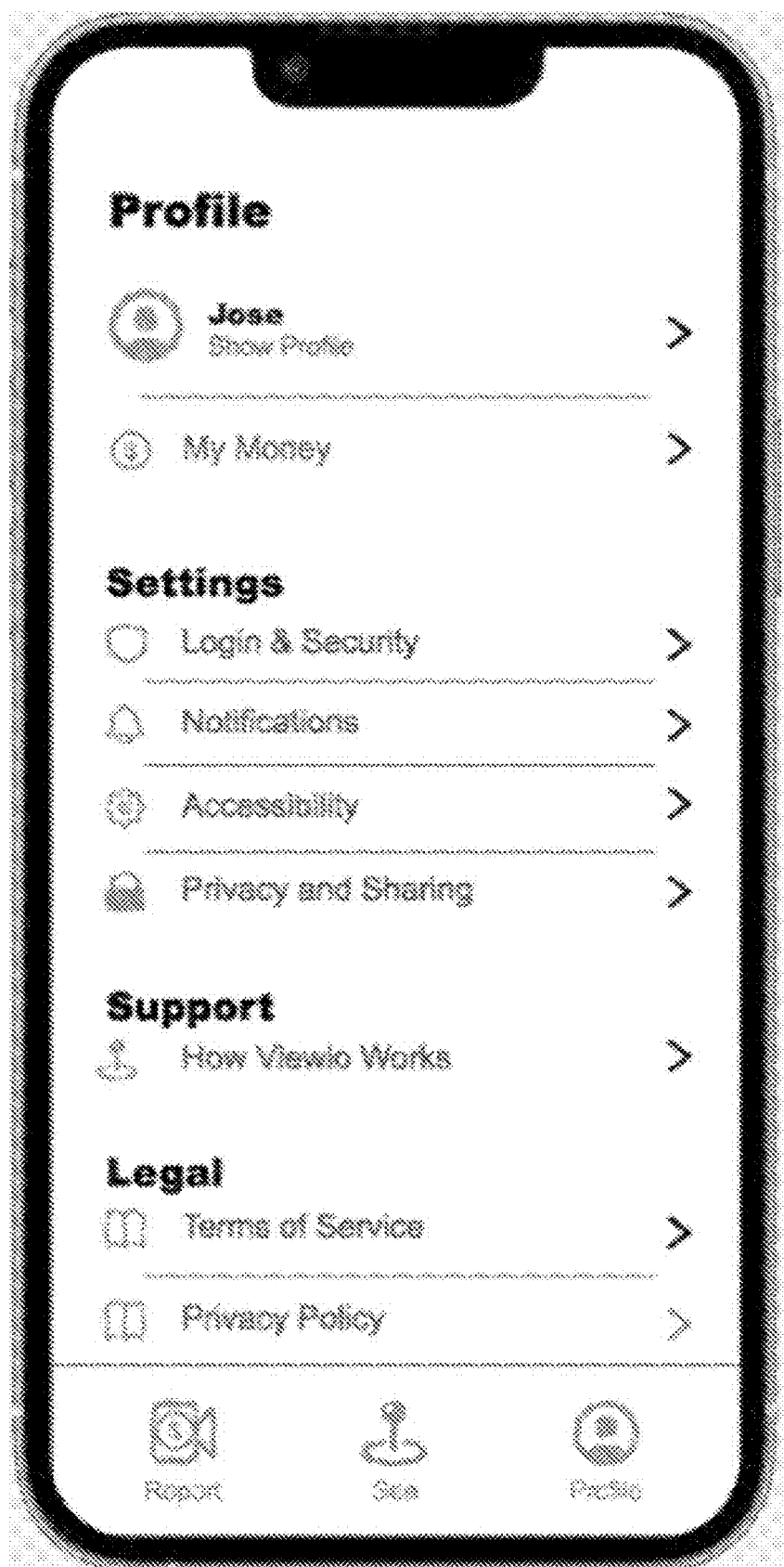
FIG. 16 illustrates a screenshot of the user profile interface, according to some embodiments.

FIG. 16 illustrates that the system 100 allows a user to view, update, or delete their profile information, including update their security and privacy settings. In some embodiments, the system 100 can present an option to present an instructional video that includes instructions for using the system 100.

Figure 17:
FIG. 17 illustrates a screenshot of the personal information editing interface, according to some embodiments.

FIG. 17 illustrates that the system 100 allows a user to view, update, or delete their profile name, email address, phone number, or any combination thereof.

Figure 18:
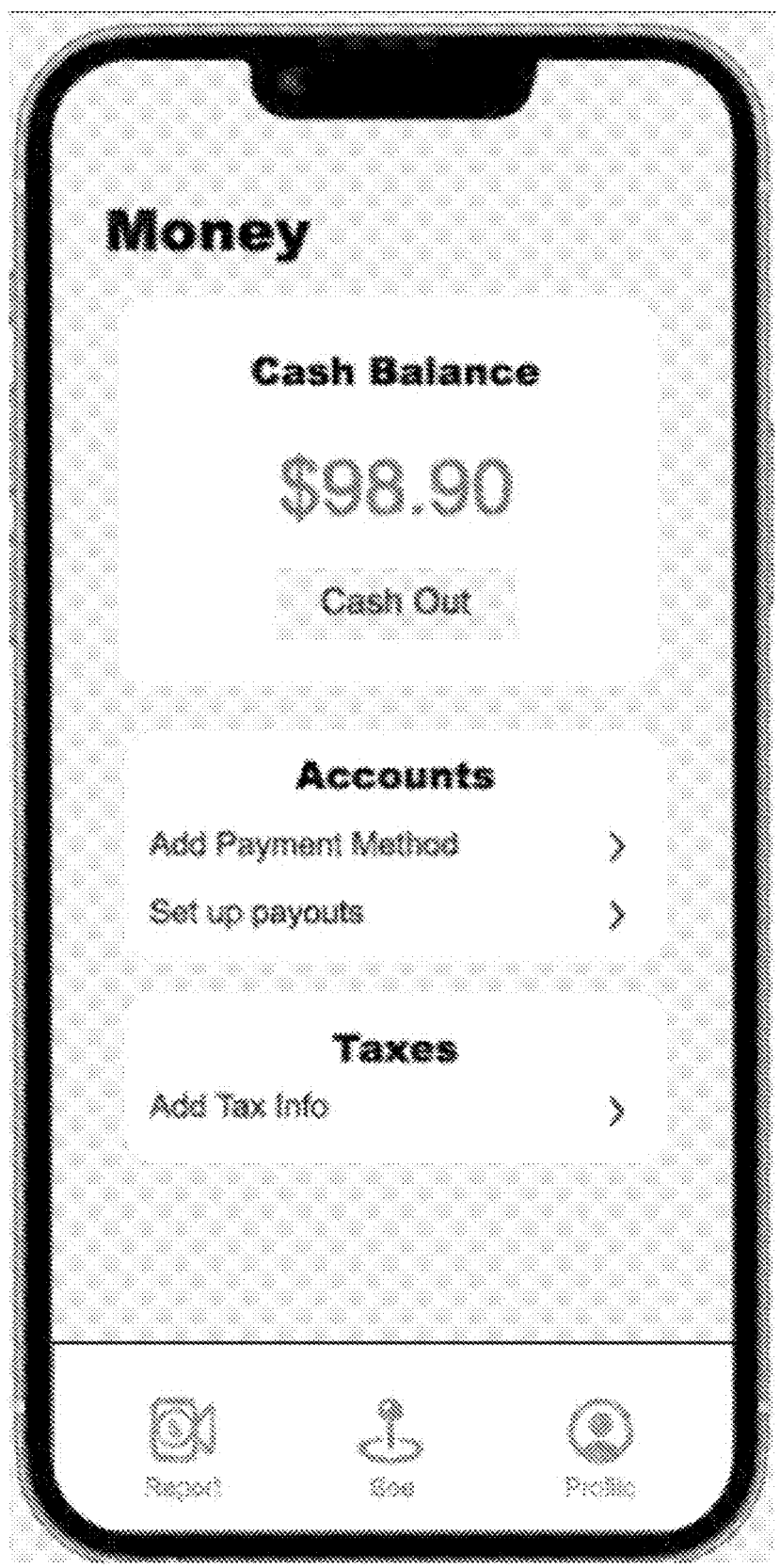
FIG. 18 illustrates a screenshot of the account balance interface, according to some embodiments.
Figure 19:
FIG. 19 illustrates a screenshot of the payment method set up interface, according to some embodiments.
Figure 20:
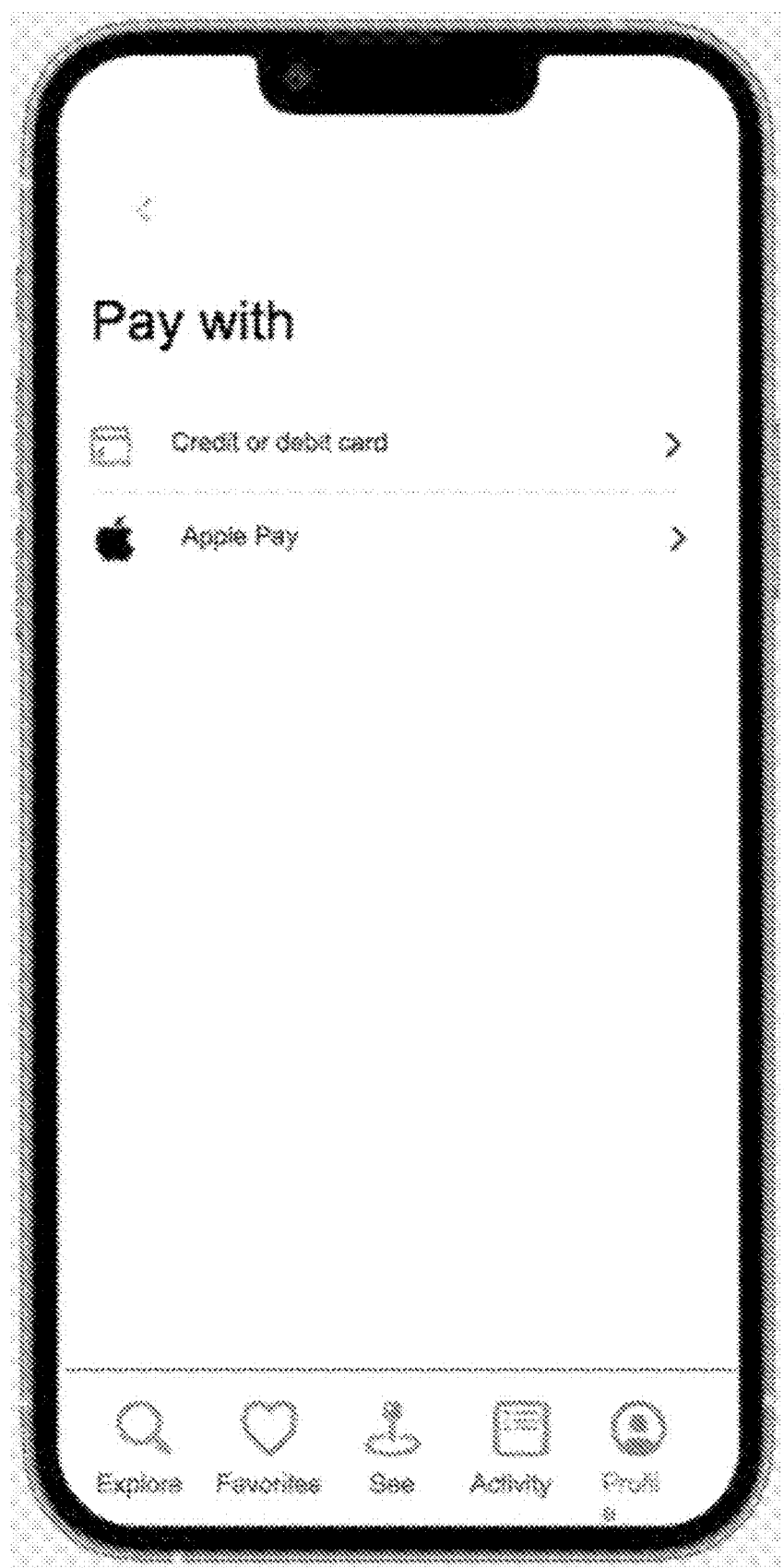
FIG. 20 illustrates a screenshot of the payment method selection interface, according to some embodiments.
Figure 21:
FIG. 21 illustrates a screenshot of the payment method details interface, according to some embodiments.
Figure 22:
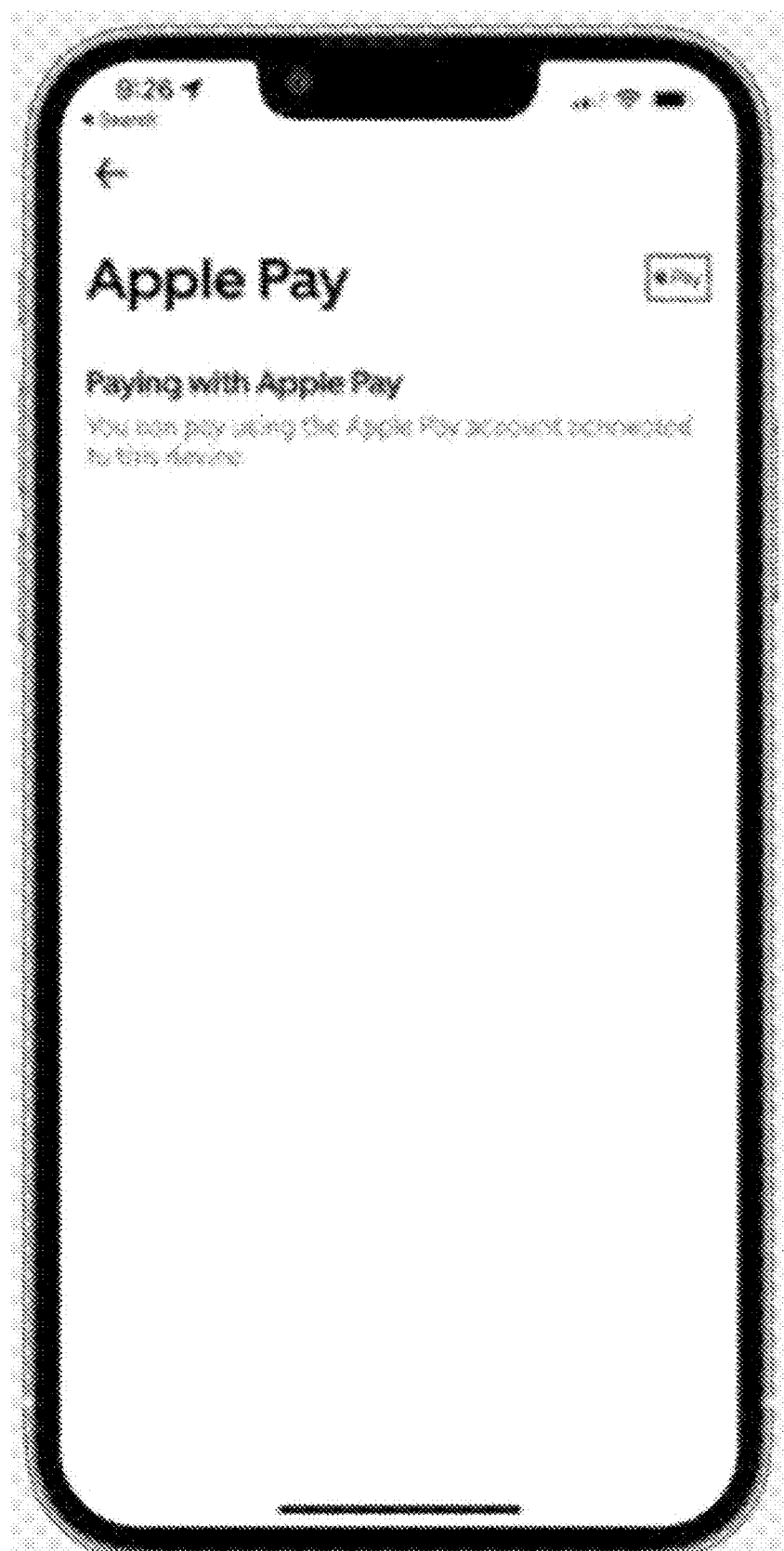
FIG. 22 illustrates a screenshot of the payment method details interface, according to some embodiments.
Figure 23:
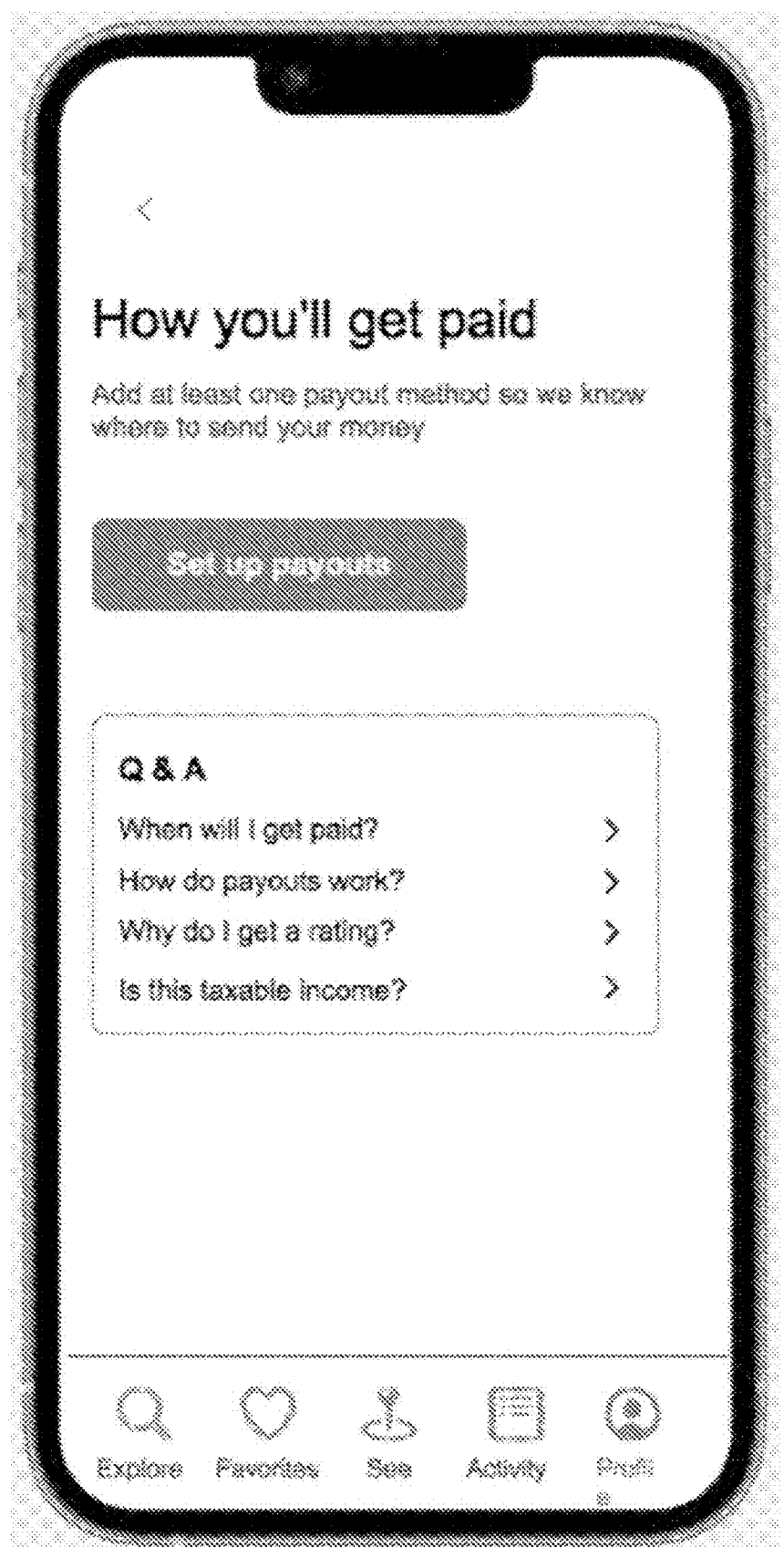
FIG. 23 illustrates a screenshot of the payout setup interface, according to some embodiments.

FIG. 18 illustrates that the system 100 allows a user to view, update, or delete their financial information. In some embodiments, the system 100 can allow a user to view their video call history, including any information associated with any video calls in their video call history, such as, for example, locations associated with the video calls.

FIGS. 19-23 illustrate that the system 100 allows a user to add, edit, or delete a payment method, such as, for example, a credit card, a debit card, an APPLE PAY account, or any combination thereof. Any user can send money to any user account using any payment method.

Figure 24:
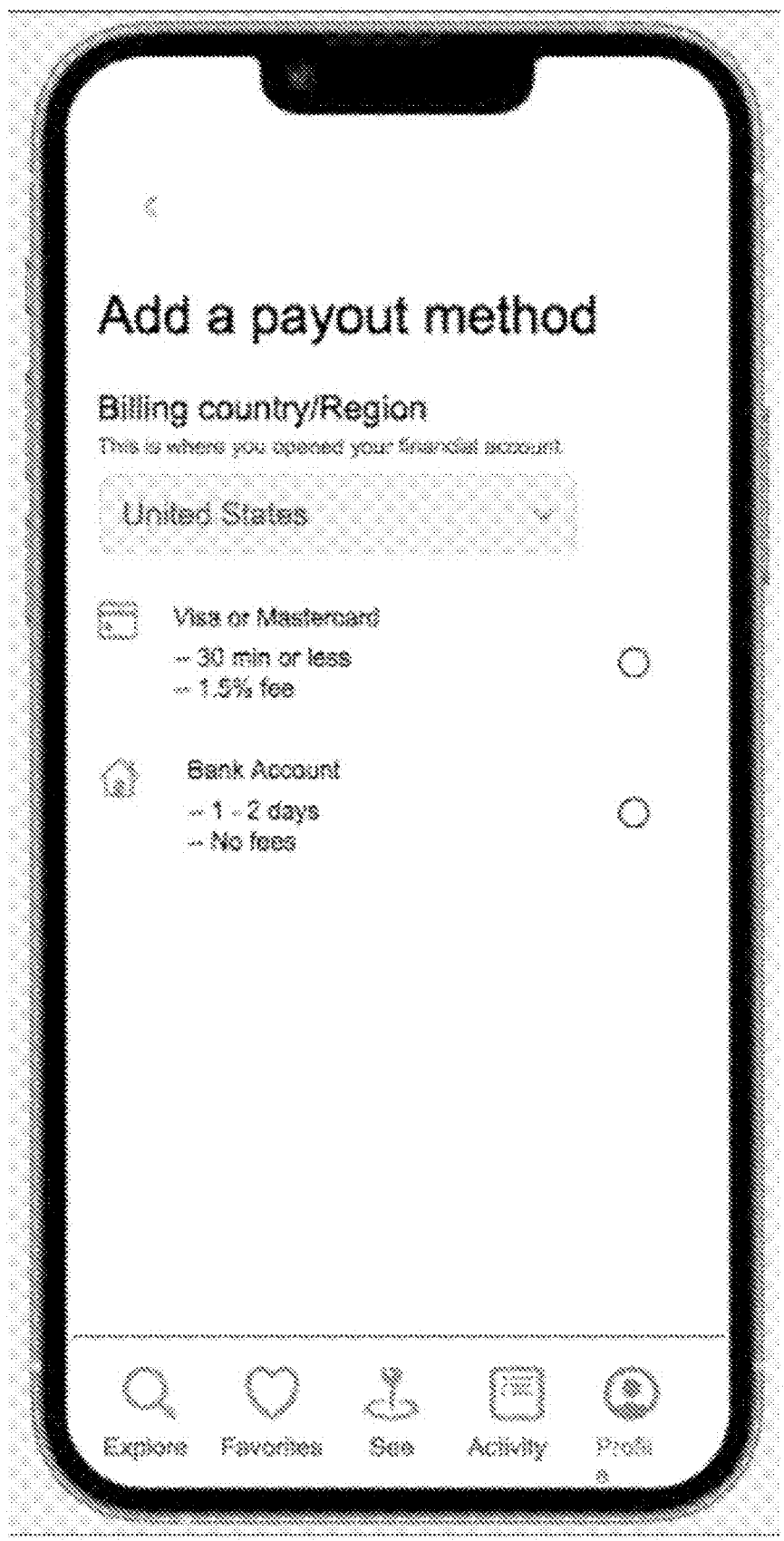
FIG. 24 illustrates a screenshot of the payout method setup interface, according to some embodiments.
Figure 25:
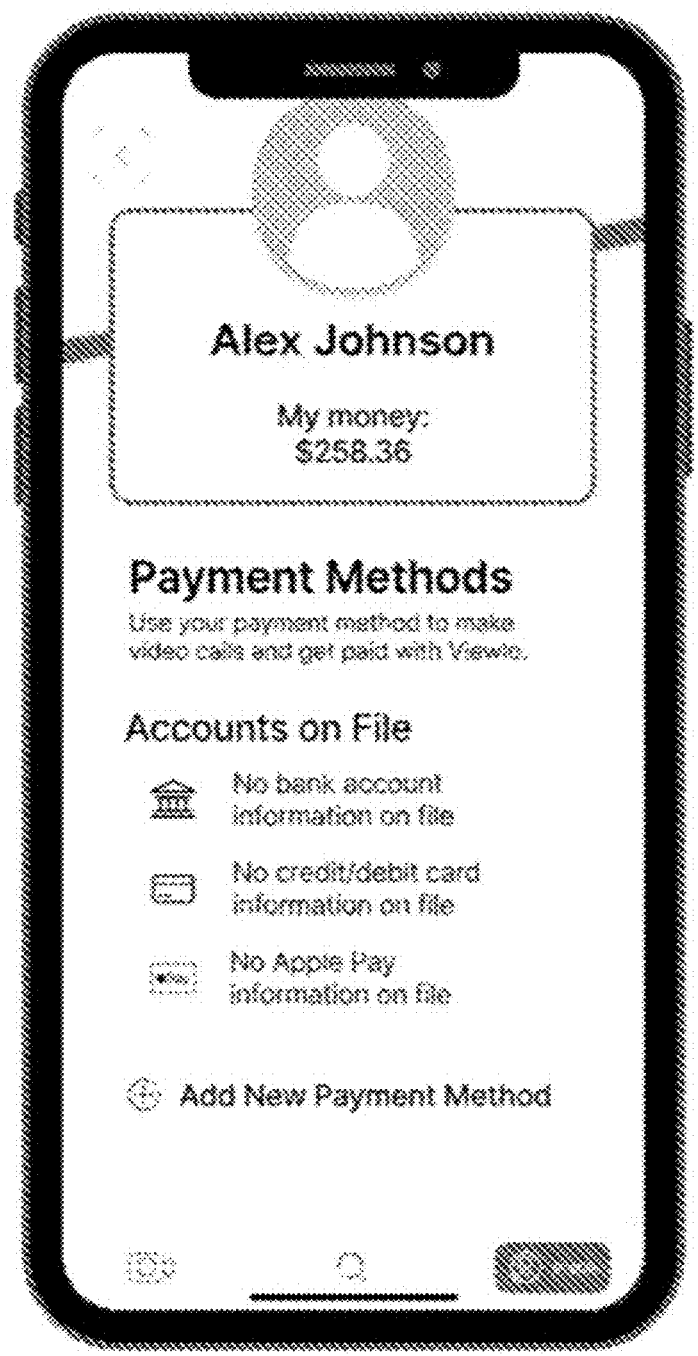
FIG. 25 illustrates a screenshot of the payment method details interface, according to some embodiments.
Figure 26:
FIG. 26 illustrates a screenshot of the tax information input interface, according to some embodiments.

FIGS. 24-26 illustrate that the system 100 allows a user to add, edit, or delete a payout method, such as, for example, a debit card, a bank account, or a combination thereof. Any user can transfer any funds from their earned balance to a debit card, a bank account, or a combination thereof.

FIGS. 26-28 illustrate that the system 100 allows a user to add, edit, or delete their tax information.

Figure 29:
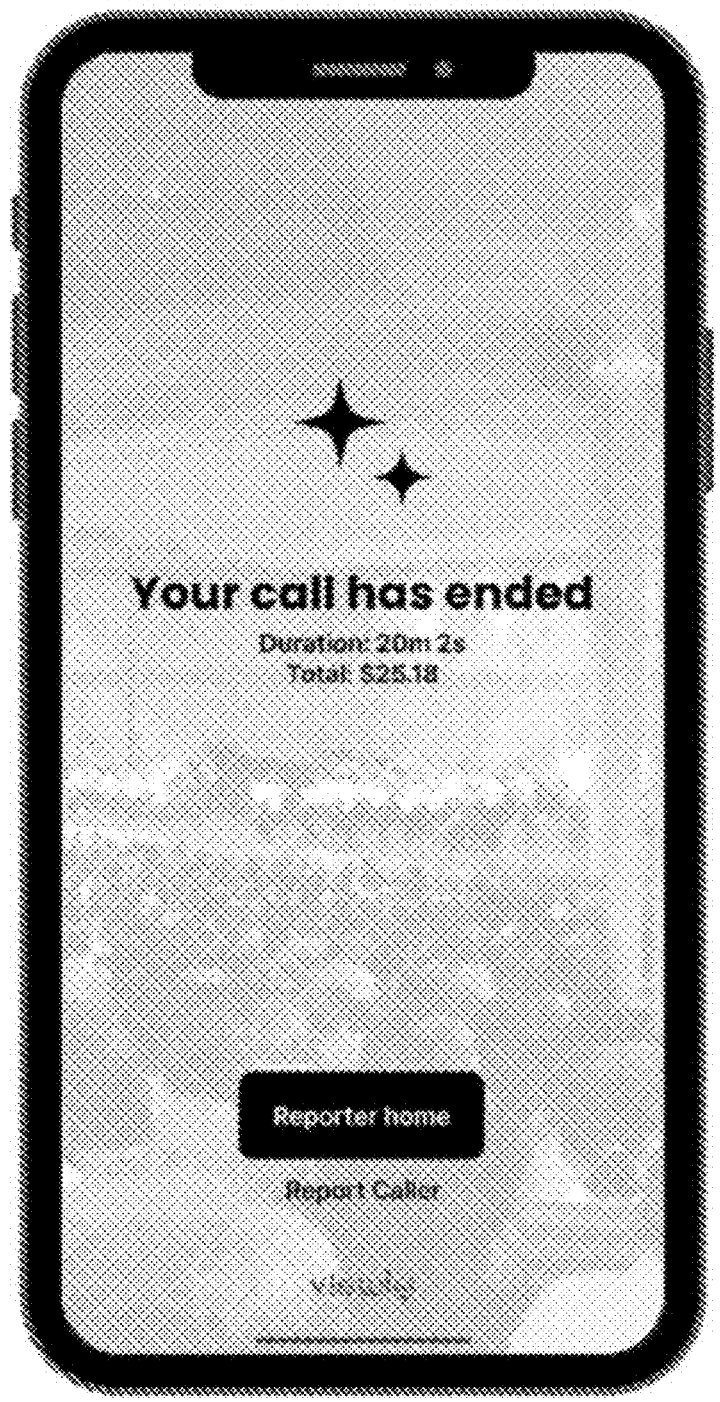
FIG. 29 illustrates a screenshot of the call ended interface, according to some embodiments.

FIG. 29 illustrate that the system 100 can allow a user of the first computing device to see call details after the video call has ended including the call duration time and the amount due to the user of the third computing device.

Figure 30:
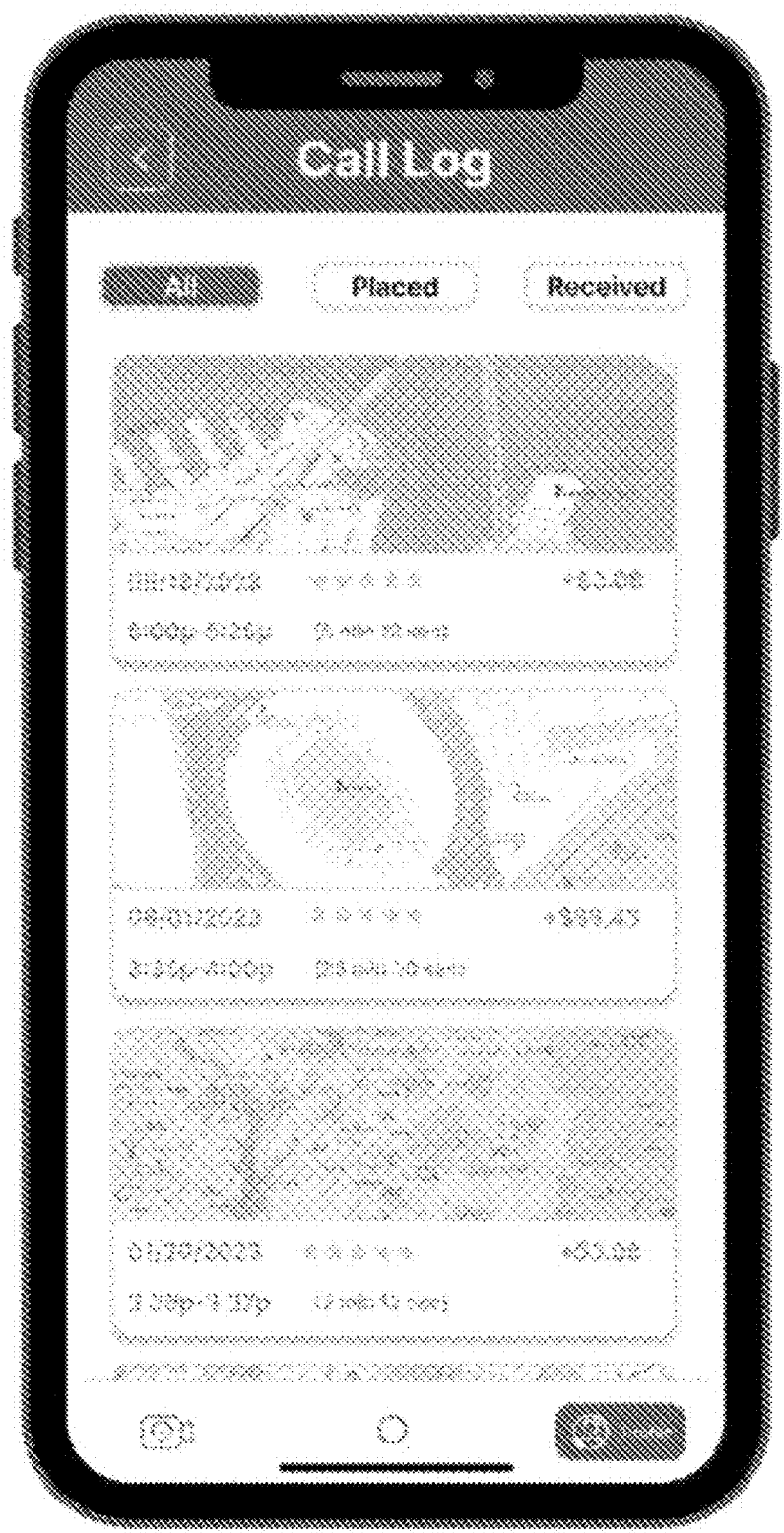
FIG. 30 illustrates a screenshot of the call log interface, according to some embodiments.

FIG. 30 illustrate that the system 100 can allow a user of the first computing device to see call history records of the video calls made and received. In some embodiments, the call history details include the date and time the call was made, the call rating, the time duration of the video call, and the amount billed and paid by user of the first computing device. In some embodiments, a user of the first computing device or the third computing device can be billed any amount of money based on the duration of the video call after the video stream ends.

Figure 31:
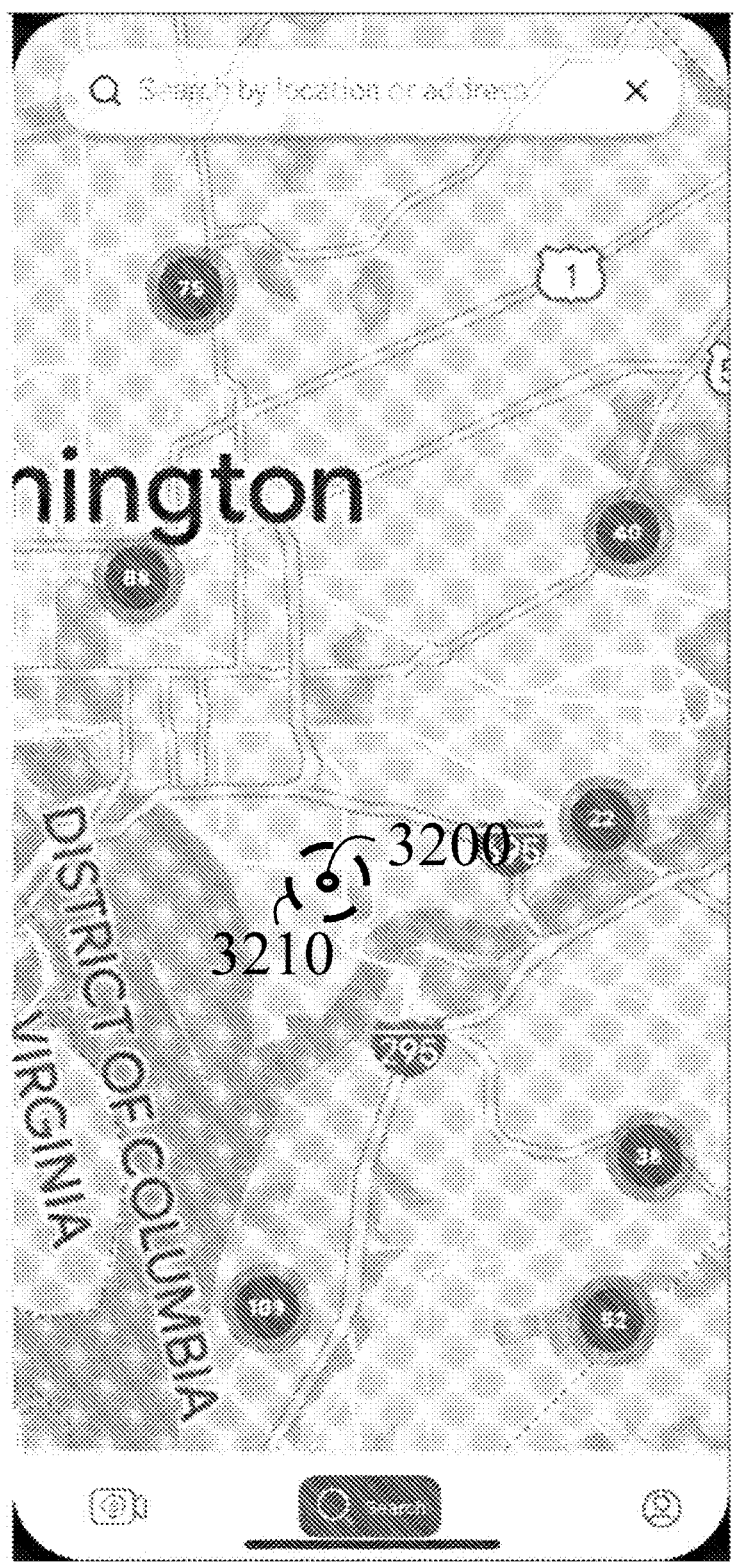
FIG. 31 illustrates a screenshot of the map interface including a predefined restricted proximity from a location, according to some embodiments.

FIG. 31 illustrates the mapping interface wherein the privacy module has determined a user location 3200 and a predefined restricted proximity 3210. The predefined restricted proximity 3210 is defined as a region wherein if the user is within the predefined restricted proximity 3210, they are unable to communicate with the user positioned at the user location 3200.

Figure 32:
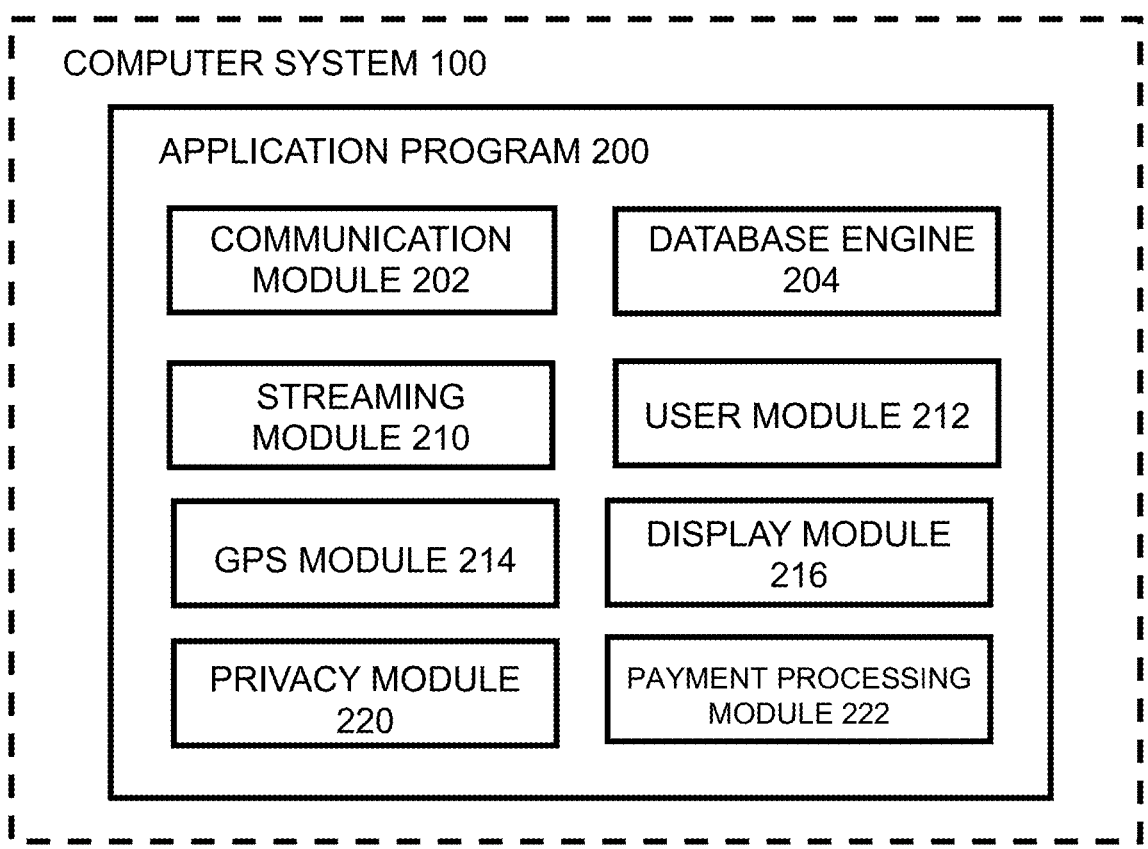
FIG. 32 illustrates a block diagram of the application program in operable communication with system, according to some embodiments.

FIG. 32 illustrates an example computer architecture for the application program 200 operated via the computing system 100. The computing system 100 comprises several modules and engines configured to execute the functionalities of the application program 200, and a database engine 204 configured to facilitate how data is stored and managed in one or more databases. In particular, FIG. 32 is a block diagram showing the modules and engines needed to perform specific tasks within the application program 200.

Referring to FIG. 32, the computing system 100 operating the application program 200 comprises one or more modules having the necessary routines and data structures for performing specific tasks, and one or more engines configured to determine how the platform manages and manipulates data. In some embodiments, the application program 200 comprises one or more of a communication module 202, a database engine 204, a streaming module 210, a user module 212, GPS module 214, a display module 216, a privacy module 220, and a payment processing module.

In some embodiments, the communication module 202 is configured for receiving, processing, and transmitting a user command and/or one or more data streams. In such embodiments, the communication module 202 performs communication functions between various devices, including the user computing device 145, the administrator computing device 185, and a third-party computing device 195. In some embodiments, the communication module 202 is configured to allow one or more users of the system, including a third-party, to communicate with one another. In some embodiments, the communications module 202 is configured to maintain one or more communication sessions with one or more servers, the administrative computing device 185, and/or one or more third-party computing device(s) 195.

In some embodiments, the communication module 202 is operable to transmit imagery including still images and video along with associated audio content. The communication module 202 may be configured to transmit video and/or audio data in real-time between the first user device and the second user device or multiple additional user devices.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations.

In some embodiments, the database engine 204 may store and transmit call log data, location data, user data, and other data related to the functionalities of the system as described herein.

In some embodiments, the streaming module 210 is operable to stream video or other imagery data which is utilized by users of the system. The streaming module 210 may also be capable of adjusting, in real-time, the streamed content such as by zooming in, zooming out, pausing, or otherwise changing the presentation of the streamed imagery.

In some embodiments, the user module 212 facilitates the creation of a user account for the application system. The user module 212 may allow the user to create a user profile which includes user information, user preferences, and user-associated information. The user module 212 may also be used to assign a user type to each user.

In some embodiments, the GPS module 214 is operable to monitor each user's location in real-time for the various purposes described herein such as by monitoring the users location to determine if the user is permitted to place or continue engaging in a video call. Further, the GPS module 214 may be operable to determine the user's location for the purposed of determining if the user is capable of initiating a video call or otherwise exchange information with other users.

In some embodiments, the display module 216 is configured to display one or more graphic user interfaces, including, e.g., one or more user interfaces, one or more consumer interfaces, one or more video presenter interfaces, etc. In some embodiments, the display module 216 is configured to temporarily generate and display various pieces of information in response to one or more commands or operations. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed in a display module 216 may not be persistently stored.

In some embodiments, the display module 216 may be operable to display may be operable to display one or more predefined restricted proximities wherein the user is not permitted to engage in a video call. The display module 216 may also display the locations of other users, the location where they are permitted to engage in a video call, etc.

In some embodiments, the privacy module 220 is operable to receive a predefined restricted proximity and restrict access to engaging in a video call or transmitting other communications. For example, a first user device may not be able to view or call a broadcaster when the first user device is within the predefined restricted proximity of the broadcaster's (i.e., the second user's) location.

In some embodiments, if a first user initiates a video call within a permitted area and then proceeds to move to a restricted area, the streaming module will end the video call and the communication module may transmit a message informing the first user that they have entered the predefined restricted perimeter.

In some embodiments, the privacy module 220 is operable to determine if/when each user is outside and/or within the predefined restricted perimeter. If the user is outside of the predefined restricted perimeter, they are allowed to place the video call to any broadcaster.

In some embodiments, the payment processing module 222 enables each user to input payment information and/or input information which is capable of receiving payments (e.g., bank account information, etc.).

Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the arts.

What is claimed is:

1. A system for video calling, comprising:
   a memory;
   one or more processors, wherein the one or more processors are configured at least to:
   receive, from a first user device, a request to search for users in a geographical area;
   determine that one or more user devices are located in the geographical area;
   receive, from the first user device, a request to video call a second user device of
   the one or more devices located in the geographical area;
   send, to the second user device, the request to video call the second user device;
   receive, from the second user device, a video stream generated by the second user device; and
   send, to the first user device, the video stream generated by the second user device.

2. The system of claim 1, wherein the one or more processors are further configured to:
   receive, from the first user device, a first request to change at least a viewing direction of a video camera of the second user device while sending, to the first user device, the video stream generated by the second user device; and
   send, to the second user device, the first request to change at least the viewing direction of the video camera while sending, to the first user device, the video stream generated by the second user device.

3. The system of claim 1, further comprising a communication module to enable the transmission of communication between the first user device and the second user device.

4. The system of claim 1, further comprising a streaming module in operable communication with a camera of the computing device to enable capture and transmission of video imagery.

5. The system of claim 1, further comprising a GPS module to determine and monitor the location of the first user and the second user in real-time.

6. The system of claim 5, further comprising a privacy module to receive the location of the first user and the second user from the GPS module.

7. The system of claim 1, further comprising a payment processing module to enable the transmission of payment between the first user and the second user.

8. A method for video calling, comprising:
   receiving, from a first user device, a request to search for users in a geographical area;
   determining that one or more user devices are located in the geographical area;
   receiving, from the first user device, the request to video call the second user device of the one or more devices located in the geographical area;
   sending, to the second user device, the request to video call the second user device;
   receiving, from the second user device, a video stream generated by the second user device; and
   sending, to the first user device, the video stream generated by the second user device.

9. The method of claim 8, further comprising the steps of:
   receiving, from the first user device, a first request to change at least a viewing direction of a video camera of the second user device while sending, to the first user device, the video stream generated by the second user device; and sending, to the second user device, the first request to change at least the viewing direction of the video camera while sending, to the first user device, the video stream generated by the second user device.

10. The method of claim 9, further comprising the steps of:
    identifying the geographical area of the one or more user devices;
    determining if the one or more user devices are permitted to receive the video call; and
    restricting the transmission of the video call if the one or more user devices are within a predefined restricted proximity.

11. The method of claim 10, wherein the predefined restricted proximity is dynamically established based on the one or more user device's current geographic location.

12. The method of claim 11, further comprising the step of terminating an ongoing video call upon the one or more devices entering the predefined restricted proximity.

13. The method of claim 12, wherein the predefined restricted proximity is displayed on a mapping interface provided on the one or more user devices.

14. A non-transitory computer-readable medium including one or more instruction that, when executed by one or more processors, cause the one or more processors to perform a method, the method comprising the steps of:
receiving, from a first user device, a request to search for users in a geographical area;
determining that one or more user devices are located in the geographical area;
receiving, from the first user device, the request to video call the second user device of the one or more devices located in the geographical area; sending, to the second user device, the request to video call the second user device;
receiving, from the second user device, a video stream generated by the second user device; and
sending, to the first user device, the video stream generated by the second user device.

15. The non-transitory computer-readable medium of claim 14, further comprising the steps of:
receiving, from the first user device, a first request to change at least a viewing
direction of a video camera of the second user device while sending, to the first user device, the video stream generated by the second user device; and
sending, to the second user device, the first request to change at least the viewing direction of the video camera while sending, to the first user device, the video stream generated by the second user device.

16. The method of claim 15, further comprising the steps of:
identifying the geographical area of the one or more user devices;
determining if the one or more user devices are permitted to receive the video call; and
restricting the transmission of the video call if the one or more user devices are within a predefined restricted proximity.

17. The method of claim 16, wherein the predefined restricted proximity is dynamically established based on the one or more user device's current geographic location.

18. The method of claim 17, further comprising the step of terminating an ongoing video call upon the one or more devices entering the predefined restricted proximity.

19. The method of claim 18, wherein the predefined restricted proximity is displayed on a mapping interface provided on the one or more user devices.

* * * * *